United States Patent
Ki et al.

(10) Patent No.: US 10,816,844 B2
(45) Date of Patent: Oct. 27, 2020

(54) DISPLAY DEVICE

(71) Applicant: SAMSUNG DISPLAY CO., LTD., Yongin-si, Gyeonggi-do (KR)

(72) Inventors: Bookan Ki, Yongin-si (KR); Hoyun Byun, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 15 days.

(21) Appl. No.: 16/384,070

(22) Filed: Apr. 15, 2019

(65) Prior Publication Data

US 2020/0026135 A1 Jan. 23, 2020

(30) Foreign Application Priority Data

Jul. 23, 2018 (KR) .................. 10-2018-0085169

(51) Int. Cl.
*G02F 1/1343* (2006.01)
*G02F 1/1335* (2006.01)
*G02F 1/1362* (2006.01)

(52) U.S. Cl.
CPC .... *G02F 1/133504* (2013.01); *G02F 1/13624* (2013.01); *G02F 1/133528* (2013.01); *G02F 1/134309* (2013.01); *G02F 1/136209* (2013.01); *G02F 1/136286* (2013.01); *G02F 2001/136222* (2013.01)

(58) Field of Classification Search
None
See application file for complete search history.

(56) References Cited

U.S. PATENT DOCUMENTS

2016/0252665 A1 9/2016 Lee et al.
2020/0117042 A1* 4/2020 Park .................. G02F 1/133512

FOREIGN PATENT DOCUMENTS

| EP | 3021165 A1 | 5/2016 |
| EP | 3499301 A1 | 6/2019 |
| JP | 2002202405 A | 7/2002 |
| JP | 2017181787 A | 10/2017 |
| KR | 1020100077906 A | 7/2010 |
| KR | 1020140047412 A | 4/2014 |
| KR | 1020160021963 A | 2/2016 |
| KR | 1020170046297 A | 5/2017 |
| WO | 2012005135 A1 | 1/2012 |

OTHER PUBLICATIONS

European Search Report for European Patent Application No. 19185365.4 dated Nov. 4, 2019.

* cited by examiner

*Primary Examiner* — Richard H Kim

(74) *Attorney, Agent, or Firm* — Cantor Colburn LLP

(57) ABSTRACT

A display device includes a first substrate on which gate lines and data lines are disposed; a second substrate facing the first substrate; a pixel disposed between the first substrate and the second substrate, and connected to the gate line and the data line; a light blocking layer disposed between the first substrate and the second substrate, and defining a light emission area of the pixel; a polarizer on the second substrate; and a first pattern layer disposed on the polarizer, and comprising a plurality of first protruding portions. The number of first protruding portions that overlap the light emission area among the plurality of first protruding portions is in a range from 3 to 15. An angle between the data line and each of the plurality of first protruding portions is in a range from about 5 degrees to about 10 degrees.

20 Claims, 21 Drawing Sheets

* PX : TFT1, TFT2, TFT3, PE1, PE2, 3351, 3352
* TFT1 : GE1, SE1, DE1, 3321
* TFT2 : GE2, SE2, DE2, 3322
* TFT3 : GE3, SE3, DE3, 3323

FIG. 21

| Moire image of display panel | | | | | | | | | | | |
|---|---|---|---|---|---|---|---|---|---|---|---|
| Angle (θ) | 0° | -1° | -2° | -3° | -4° | -5° | -6° | -7° | -8° | -9° | -10° |
| Moire size | Medium | Weak | Medium weak | Medium | Medium | Weak | Very weak | X | X | X | X |

DISPLAY DEVICE

This application claims priority to Korean Patent Application No. 10-2018-0085169, filed on Jul. 23, 2018, and all the benefits accruing therefrom under 35 U.S.C. § 119, the disclosure of which is incorporated by reference herein in its entirety.

BACKGROUND

1. Field

Embodiments of the invention relate to a display device, and more particularly, to a display device capable of substantially minimizing or effectively preventing the moiré phenomenon.

2. Description of Related Art

Liquid crystal display ("LCD") devices are one of the most widely used types of flat panel display ("FPD") devices. An LCD device includes two substrates on which electrodes are disposed or formed and a liquid crystal layer which is interposed therebetween.

An LCD device is a display device that adjusts the amount of transmitted light by applying voltage to the two electrodes and rearranging liquid crystal molecules of the liquid crystal layer.

SUMMARY

Embodiments of the invention are directed to a display device capable of substantially minimizing or effectively preventing the moiré phenomenon.

According to an embodiment, a display device includes: a display substrate including: a display signal line provided in plurality; a pixel connected to the display signal line and including a light emission area; and a light blocking layer which defines the light emission area of the pixel; a polarizer on the display substrate; and an optical film which disposes the polarizer between the display substrate and the optical film, the optical film including a first pattern layer including a plurality of first protruding portions. Among the plurality of first protruding portions within the optical film, a number of first protruding portions which overlaps the light emission area of the pixel is in a range from 3 to 15, and an angle between the display signal line and each of the plurality of first protruding portions is in a range from about 5 degrees to about degrees.

The angle may be measured in a counterclockwise direction from the display signal line.

The first protruding portions may be arranged along a first direction, and each of the first protruding portions may extend along a second direction which intersects the first direction.

An upper surface of at least one of the first protruding portions may have a concavo-convex shape.

A distal end of a first protruding portion may include: a first edge and a second edge facing each other along the first direction, a first projection and a second projection respectively protruding from the first and second edges to be spaced apart from each other along the first direction, and a recess defined between the first and second projections spaced apart from each other, where an upper surface of the first protruding portion at the recess thereof may have a concavo-convex shape which extends along the second direction.

The concavo-convex shape of the upper surface may include a concave portion and a convex portion alternating along the second direction.

Distances along the first direction between first protruding portions adjacent to each other may be the same as each other.

Each of the first protruding portions may have a trapezoidal shape, a parabolic shape or a semicircular shape in cross-section.

The plurality of display signal lines may include a gate line and a data line which intersect each other, the angle in the range from about 5 degrees to about 10 degrees may be defined between the data line and each of the plurality of first protruding portions, and the light emission area may include a first sub-light emission area and a second sub-light emission area which is larger than the first sub-light emission area, the first and second sub-light emission areas being arranged along a length extension direction of the data line. The pixel may further include a first sub-pixel electrode corresponding to the first sub-light emission area; a second sub-pixel electrode corresponding to the second sub-light emission area; a first sustain electrode overlapping the first sub-pixel electrode; a second sustain electrode overlapping the second sub-pixel electrode; a first switching element connected to the gate line, the data line, and the first sub-pixel electrode; a second switching element connected to the gate line, the first switching element, and the second sub-pixel electrode; and a third switching element connected to the gate line, the second switching element, the first sustain electrode, and the second sustain electrode. A drain electrode of the third switching element may be connected to the first and second sustain electrodes and may overlap a center portion of the first sub-pixel electrode and a center portion of the second sub-pixel electrode.

An angle between each of the first protruding portions and a length extension direction of the drain electrode of the third switching element may be in a range from about 5 degrees to about 10 degrees.

The angle between each of the first protruding portions and the drain electrode may be measured in a counterclockwise direction from the drain electrode.

The optical film may further include a second pattern layer which disposes the first pattern layer between the polarizer and the second pattern layer, the second pattern layer having a refractive index different from a refractive index of the first pattern layer.

The second pattern layer may include a plurality of second protruding portions which protrude toward the first pattern layer.

Within the first pattern layer, the first protruding portions may be arranged along a first direction, and each of the first protruding portions may extend along a second direction which intersects the first direction. The first protruding portions and the second protruding portions may be arranged in an alternating manner along the first direction.

According to an embodiment, a display device includes: a display panel including: a gate line and a data line which intersect each other; and a pixel including a switching element connected to the gate line and the data line, and a pixel electrode which is connected to the switching element; a polarizer on the display panel; and an optical film which disposes the polarizer between the display panel and the optical film, the optical film including a first pattern layer including a plurality of first protruding portions. Among the plurality of first protruding portions within the optical film, a number of first protruding portions which overlaps the pixel electrode is in a range from 3 to 15. An angle between the data line and each of the plurality of first protruding portions is in a range from about 5 degrees to about 10 degrees.

The angle may be measured in a counterclockwise direction from the data line.

The display device may further include a light blocking layer which defines a light emission area of the pixel.

The number of first protruding portions which overlaps the light emission area may be in a range from 3 to 15.

The light emission area may include a first sub-light emission area and a second sub-light emission area which are disposed along a length extension direction of the data line.

The pixel may further include: a first sub-pixel electrode corresponding to the first sub-light emission area; and a second sub-pixel electrode corresponding to the second sub-light emission area.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, where:

FIG. 21 is a view for explaining relative sizes of moiré according to an angle between a reference line and a first protruding portion of an optical film for a display device.

DETAILED DESCRIPTION

Figure 1:
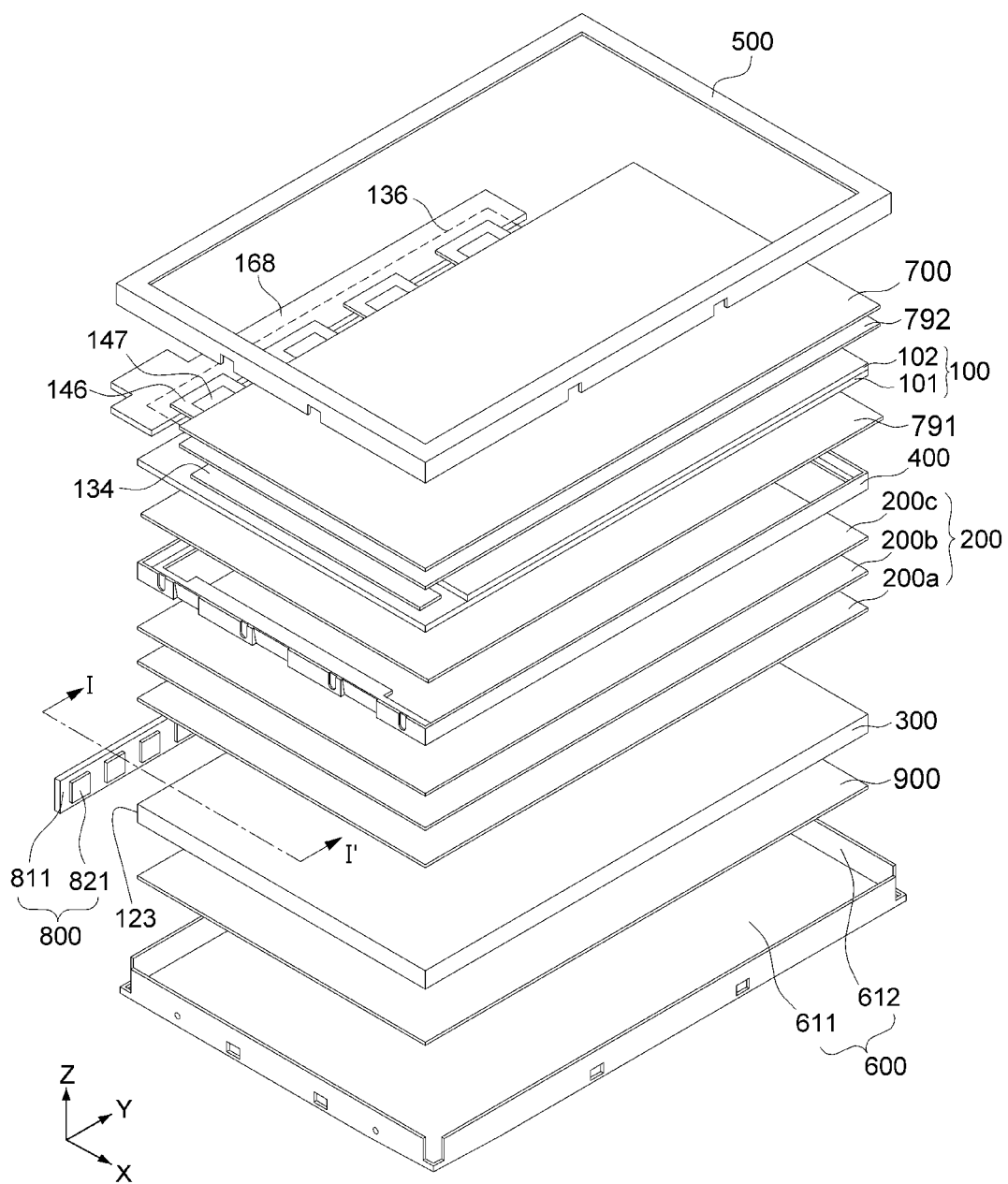
FIG. 1 is an exploded perspective view illustrating an embodiment of a display device according to the invention.

Embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" another layer, area, or plate, it may be directly on the other layer, area, or plate, or intervening layers, areas, or plates may be present therebetween. Conversely, when a layer, area, or plate is referred to as being related to another element such as being "directly on" another layer, area, or plate, intervening layers, areas, or plates may be absent therebetween. Further when a layer, area, or plate is referred to as being related to another element such as being "below" another layer, area, or plate, it may be directly below the other layer, area, or plate, or intervening layers, areas, or plates may be present therebetween. Conversely, when a layer, area, or plate is referred to as being related to another element such as being "directly below" another layer, area, or plate, intervening layers, areas, or plates may be absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "mechanically connected" or "physically connected" such as by being in contact with the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to in specific describe embodiments of the invention and like reference numerals refer to like elements throughout the specification.

Hereinafter, embodiments of a display device according to the invention will be described in detail with reference to FIGS. 1 to 21.

Figure 2:
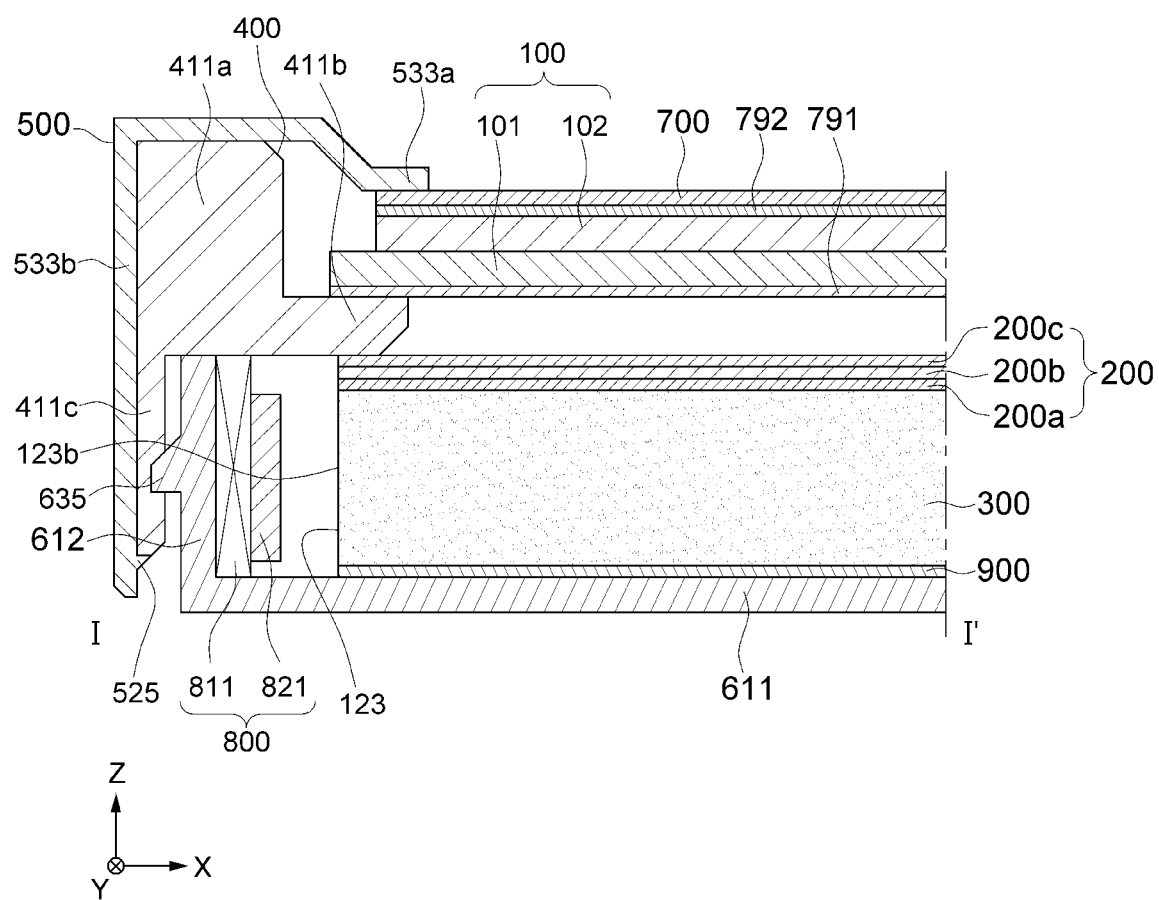
FIG. 2 is a cross-sectional view taken along line I-I' of FIG. 1.

FIG. 1 is an exploded perspective view illustrating an embodiment of a display device according to the invention, and FIG. 2 is a cross-sectional view taken along line I-I' of FIG. 1.

As illustrated in FIGS. 1 and 2, a display device according to an embodiment of the invention includes a light source module 800, a bottom case 600, a reflection plate 900, a light guide plate 300, an optical sheet 200, a support frame 400, a first polarizer 791, a display panel 100, a second polarizer 792, an optical film 700, and a top case 500.

The bottom case 600, the reflection plate 900, the light guide plate 300, the optical sheet 200, the support frame 400, the display panel 100, and the top case 500 are sequentially arranged along a Z-axis direction.

The bottom case 600 has or forms an accommodation space therein. The light source module 800, the reflection plate 900, the light guide plate 300, and the optical sheet 200 are disposed in the accommodation space.

In order to secure the accommodation space, the bottom case 600 may include an accommodation portion 611 and a plurality of side portions 612 provided. In an embodiment, for example, the accommodation (bottom) portion 611 may have a quadrangular shape in a top plan view, and the side portions 612 protrude from respective edge portions of the accommodation portion 611 to have a predetermined height from the bottom portion 611. In an embodiment, for example, the side portions 612 may protrude along the Z-axis direction from respective edges of the accommodation portion 611. In an embodiment, for example, the side portions 612 may protrude toward the top case 500 from the respective edges of the accommodation portion 611.

Edges of the side portions 612 that are adjacently disposed to each other may be connected to each other. A space defined by the side portions 612 together with the accommodation portion 611 may correspond to the aforementioned accommodation space. In an embodiment, a locking projection 635 may be disposed on an outer side of one or more of the side portions 612, and the support frame 400 may be fastened to the bottom case 600 by the locking projection 635. In an embodiment, the locking projection 635 may be disposed outwardly extended from two side portions 612 which oppose each other relative to the bottom portion 611. A portion of the corresponding side portion 612 may protrude toward the support frame 400, thereby defining or forming the locking projection 635.

The light source module 800 generates light. The light generated in the light source module 800 may be provided to the display panel 100 through the light guide plate 300 and the optical sheet 200.

The light source module 800 may include at least one light source 821 and a light source circuit board 811.

The light source 821 emits light. In an embodiment, for example, the light source 821 may emit white light.

The light source 821 faces the light guide plate 300. In an embodiment, for example, a light emission surface of the light source 821 may face a light incident surface 123 of the light guide plate 300. In other words, the light source 821 emits light through the light emission surface thereof, and a side surface of the light guide plate 300 that faces the light emission surface of the light source 821 may be defined as the aforementioned light incident surface 123.

The light source 821 may include, for example, a blue light emitting diode ("LED") that emits blue light and a phosphor which surrounds the blue LED. The blue light from the blue LED may be converted into white light while passing through the phosphor.

As another example, the light source 821 may include a red LED that emits red light, a green LED that emits green light, and a blue LED that emits blue light. The red light from the red LED, the green light from the green LED, and the blue light from the blue LED may be mixed with each other to generate white light which is emitted from the light source 821.

The light source 821 may be provided in plurality. When the light source module 800 includes the plurality of light sources 821, the plurality of light sources 821 are disposed or arranged along a length of the light incident surface 123. In other words, the plurality of light sources 821 are disposed along a Y-axis direction, to each face the light incident surface 123.

One surface of the light source circuit board 811 may be divided into at least one mounting area and a wiring area. When the light source module 800 includes the plurality of light sources 821, the light sources 821 are disposed on the one surface of the light source circuit board 811 and in the respective mounting areas of the light source circuit board 811, and a plurality of driving signal lines for transmitting driving power to the light sources 821 are disposed on the one surface of the light source circuit board 811 and in the wiring area of the light source circuit board 811. The aforementioned driving power is generated in an external power supplier (not illustrated), and then applied to the plurality of driving signal lines via a separate connector (not illustrated).

Among side surfaces of the light guide plate 300 in the top plan view, the light source module 800 may be disposed at one side surface, opposite side surfaces, or all four side surfaces of the light guide plate 300 according to the size and luminous uniformity of the display panel 100. The side surfaces of the light guide plate 300 each connect a light emission surface which faces the display panel 100 and a lower outer surface which faces the reflection plate 900, to each other. A light incident surface of the light guide plate 300 is one of these side surfaces.

The reflection plate 900 is positioned on the accommodation portion 611 of the bottom case 600. In an embodiment, for example, the reflection plate 900 is positioned between the accommodation portion 611 and the light guide plate 300. The reflection plate 900 reflects light that has passed through the lower outer surface of the light guide plate 300 so that the light may proceed back toward the light guide plate 300. Accordingly, a light loss rate may be substantially minimized.

The light guide plate 300 is positioned on the reflection plate 900. In an embodiment, for example, the light guide plate 300 is positioned between the reflection plate 900 and the optical sheet 200. The light incident surface 123 of the first light guide plate 300 faces the light source 821. The light emitted from the light source 821 is incident to the light incident surface 123 and then proceeds to and through the inside of the light guide plate 300. The light in the light guide plate 300 may be transmitted to the optical sheet 200 which is toward the display panel 100 by total reflection. In addition, the light in the light guide plate 300 may be transmitted to an end portion of the light guide plate 300 by the total reflection. In such a case, the end portion of the light guide plate 300 refers to a side surface of the light guide plate 300 that faces the light incident surface 123.

The light guide plate 300 may include or be formed of an acrylic resin, such as polymethyl methacrylate ("PMMA"), polycarbonate ("PC"), reinforced glass, or the like.

The optical sheet 200 is positioned on the light guide plate 300. In an embodiment, for example, the optical sheet 200 is positioned between the light guide plate 300 and the display panel 100. The optical sheet 200 diffuses and collimates light directed thereto from the light guide plate 300, and emits light toward the display panel 100.

The optical sheet 200 may include a diffusion sheet 200a, a collimation sheet 200b, and a protection sheet 200c. The diffusion sheet 200a, the collimation sheet 200b, and the protection sheet 200c may be stacked on the light guide plate 300 sequentially.

The diffusion sheet 200a serves to diffuse light guided from the light guide plate 300 so as to substantially reduce or effectively prevent the light from being partially concentrated.

The collimation sheet 200b is disposed on the diffusion sheet 200a. In specific, the collimation sheet 200b is disposed between the diffusion sheet 200a and the protection sheet 200c. The collimation sheet 200b collimates the light diffused by the diffusion sheet 200a. In an embodiment, for example, the collimation sheet 200b collimates the light in a direction substantially perpendicular to a surface of the protection sheet 200c that faces the collimation sheet 200b. To this end, prisms having a triangular cross-section may be disposed in a predetermined arrangement on a surface of the collimation sheet 200b that faces a surface of the protection sheet 200c.

The protection sheet 200c is positioned on the collimation sheet 200b. The protection sheet 200c serves to protect a surface of the collimation sheet 200b and diffuse light to achieve uniform light distribution. A light transmitted through the protection sheet 200c is emitted from the optical sheet 200 and directed to the display panel 100.

The support frame 400 is fastened to the bottom case 600 to support the display panel 100 and the top case 500. In addition, the support frame 400 maintains an interval between the display panel 100 and the optical sheet 200 to be substantially constant. To this end, as illustrated in FIG. 2, the support frame 400 may have an overall quadrangular frame shape including a first support portion 411a, a second support portion 411b, and a fastening portion 411c. These portions may be disposed at all sides of the display device in the top plan view, without being limited thereto.

The first support portion 411a is extended to be disposed on the plurality of side portions 612, and supports the top case 500 thereon.

The second support portion 411b extends from an inner edge of the first support portion 411a toward a space between the optical sheet 200 and the display panel 100 (or the first polarizer 791). The second support portion 411b has a lower height than a height of the first support portion 411a. That is, an uppermost surface of the first support portion 411a is disposed further in the Z-axis direction than the second support portion 411b.

The different-height first and second support portions 411a and 411b form a step. A space (or gap) is defined between the top case 500 and the second support portion 411b by the height difference between an uppermost surface of the second support portion 411b and an uppermost surface of the first support portion 411a. An edge of the display panel 100 (or the first polarizer 791) is positioned in the space at the step formed by the uppermost surfaces of the first and second support portions 411a and 411b.

The fastening portion 411c extends from a lower surface of the first support portion 411a and toward the side portion 612. A coupling groove is defined at an inner side surface of the fastening portion 411c, that is, one of surfaces of the fastening portion 411c that faces the locking projection 635. As the locking projection 635 is inserted into the coupling groove, the support frame 400 may be fastened to the bottom case 600.

The top case 500 has an overall quadrangular frame shape having an opening at a center portion thereof. The top case 500 is positioned on the display panel 100. A display area of the display panel 100 (or the optical film 700) at which an image is displayed is exposed through the opening of the top case 500 to outside the display device. The top case 500 covers an edge portion of the display panel 100 (or the optical film 700), an upper surface and a side surface of the first support portion 411a of the support frame 400, and a side surface of the fastening portion 411c of the support frame 400. To this end, the top case 500 includes a front cover 533a that covers the edge portion of the display panel 100 (or the optical film 700) and the upper surface of the first support portion 411a, and a side cover 533b that covers both of the side surface of the first support portion 411a and the side surface of the fastening portion 411c. These portions of the top case 500 may be disposed at all sides of the display device in the top plan view, without being limited thereto.

In an embodiment, a hook 525 may be positioned at an inner side surface of the side cover 533b, and the hook 525 contacts a lower surface of the fastening portion 411c of the support frame 400. The top case 500 may be fastened to the support frame 400 by the hook 525. In addition, one of the side covers 533b has an opening. A printed circuit board ("PCB") 168 to be described below is exposed outside the top case 500 through the opening of the side cover 533b.

The display panel 100 is positioned on the optical sheet 200. The display panel 100 generates and/or displays an image. The display panel 100 includes a first (display) substrate 101 and a second (display) substrate 102 which is located to face the first substrate 101. Although not illustrated in FIG. 1, the display panel 100 further includes a light control layer disposed between the first substrate 101 and the second substrate 102.

The light control layer controls transmittance of light provided from the optical sheet 200. Any element that may control the transmittance of light may be used as the light control layer. In embodiments, for example, the light control layer may be one of a liquid crystal layer, an electro-wetting layer, and an electrophoretic layer. Hereinafter, the light control layer is to be described as a liquid crystal layer by way of example.

Although not illustrated in FIG. 1, a plurality of display signal lines such as a gate line and a data line, and a pixel electrode which is connected to the display signal lines, are disposed in or on the first substrate 101. The display signal lines and pixel electrode may be disposed on a base substrate within the first substrate 101 without being limited thereto. The gate line, the data line and the pixel electrode may each be provided in plurality within the display panel 100. The data lines intersect the gate lines. The gate lines are connected to a gate driver 134, and the data lines are connected to a data driver 136. As display signal lines, the gate lines and the data lines which are connected to pixels may transmit image data, control signals, driving signals, etc. to the pixels to thereby drive the pixels to display an image.

The gate driver 134 may be located at a non-display area of the first substrate 101 which excludes the display area of the first substrate 101. The gate driver 134 generates control or driving signals such as a gate signals according to a gate control signal applied from a timing controller (not illustrated), and sequentially applies the gate signals to the plurality of gate lines. The gate driver 134 may include, for example, a shift register that shifts a gate start pulse based on a gate shift clock to produce the gate signals. The shift register may include a plurality of driving transistors.

The data driver 136 includes a plurality of data driving integrated circuits ("ICs") 147. The data driving ICs 147 receive digital image data signals and a data control signal applied thereto from the timing controller. The data driving ICs 147 sample the digital image data signals according to the data control signal, latch the sampled image data signals corresponding to one horizontal line every horizontal period, and apply the latched image data signal to the data lines. That is, the data driving ICs 147 convert the digital image data signals applied from the timing controller into analog data signals using a gamma voltage applied from a power supplier (not illustrated), and apply the analog image signals to the data lines.

Respective data driving ICs 147 are mounted on a carrier 146. The carrier 146 may be provided in plurality. The carriers 146 are each connected between the PCB 168 and the display panel 100. The timing controller and the power supplier described above may be positioned on the PCB 168. The carrier 146 includes input wirings configured to transmit various signals applied thereto from the timing controller and the power supplier to the data driving IC 147, and output wirings configured to transmit the image data signals output from the data driving IC 147 to the corresponding one of the data lines.

In an embodiment, at least one carrier 146 may further include auxiliary lines to transmit various control or driving signals applied from the timing controller and the power supplier to the gate driver 134, and the auxiliary lines are connected to connection lines located at the first substrate 101. The connection lines connect the auxiliary wirings and the gate driver 134 to each other. The connection lines may be disposed or formed in or on the first substrate 101 in a line-on-glass manner.

The display panel 100 may be positioned between the first polarizer 791 and the second polarizer 792. The first polarizer 791 is disposed on an outer surface of the first substrate 101 which is closest to a viewing side of the display device, and the second polarizer 792 is disposed on an outer surface of the second substrate 102 which is furthest from the viewing side of the display device. Herein, when facing surfaces of the first substrate 101 and the second substrate 102 are defined as inner surfaces of the corresponding substrates, the respective outer surfaces of the first substrate 101 and the second substrate 102 means surfaces of the corresponding substrates that are positioned opposite to the respective inner surfaces.

An optical axis of the first polarizer 791 may intersect an optical axis of the second polarizer 792. In an embodiment, for example, when the optical axis of the first polarizer 791 is parallel to an X-axis direction, the optical axis of the second polarizer 792 may be parallel to the Y-axis direction.

The optical film 700 is positioned on the second polarizer 792. In an embodiment, for example, the optical film 700 and the second substrate 102 may face each other with the second polarizer 792 therebetween. The optical film 700 is disposed in a light emission direction of the second polarizer 792, such that light passed through the second polarizer 792 passes through the optical film 700 at a viewing side of the display device.

The optical film 700 and the second polarizer 792 may be integrally formed into a unitary structure to constitute a polarizing member. In other words, the polarizing member may collectively include the second polarizer 792 and the optical film 700 which is disposed on the second polarizer 792.

The optical film 700 may diffuse the light (e.g., polarized light) incident from the second polarizer 792. The optical film 700 may improve a contrast ratio and luminance uniformity at the viewing side of the display device, improve a viewing angle at the viewing side, and substantially minimize a difference in luminance uniformity according to a screen size of display devices (e.g., liquid crystal display ("LCD") devices). In addition, the optical film 700 may substantially minimize or effectively prevent the moiré phenomenon.

Figure 3:
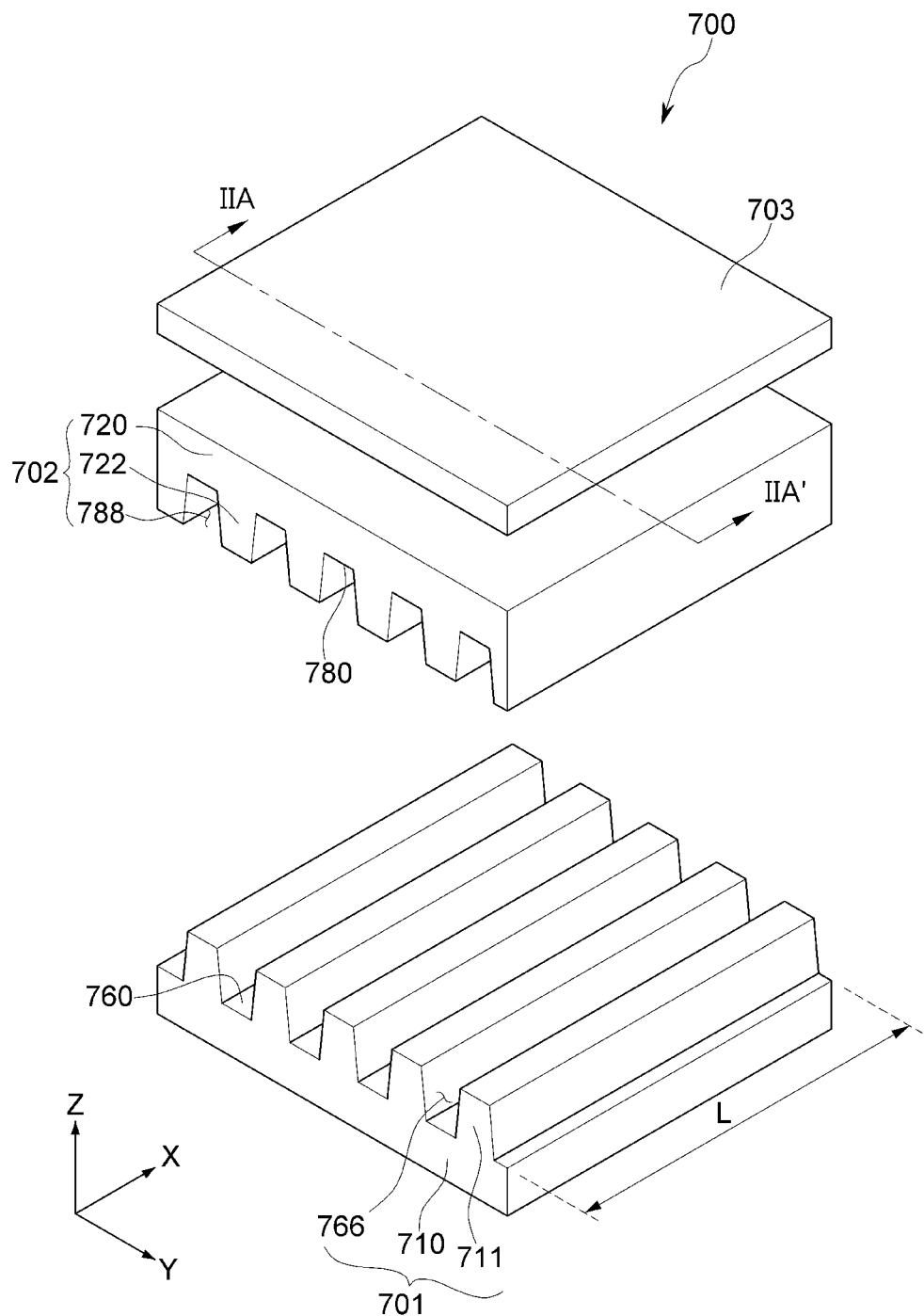
FIG. 3 is an exploded perspective view illustrating an embodiment of an optical film in the display device of FIG. 2.
Figure 4:
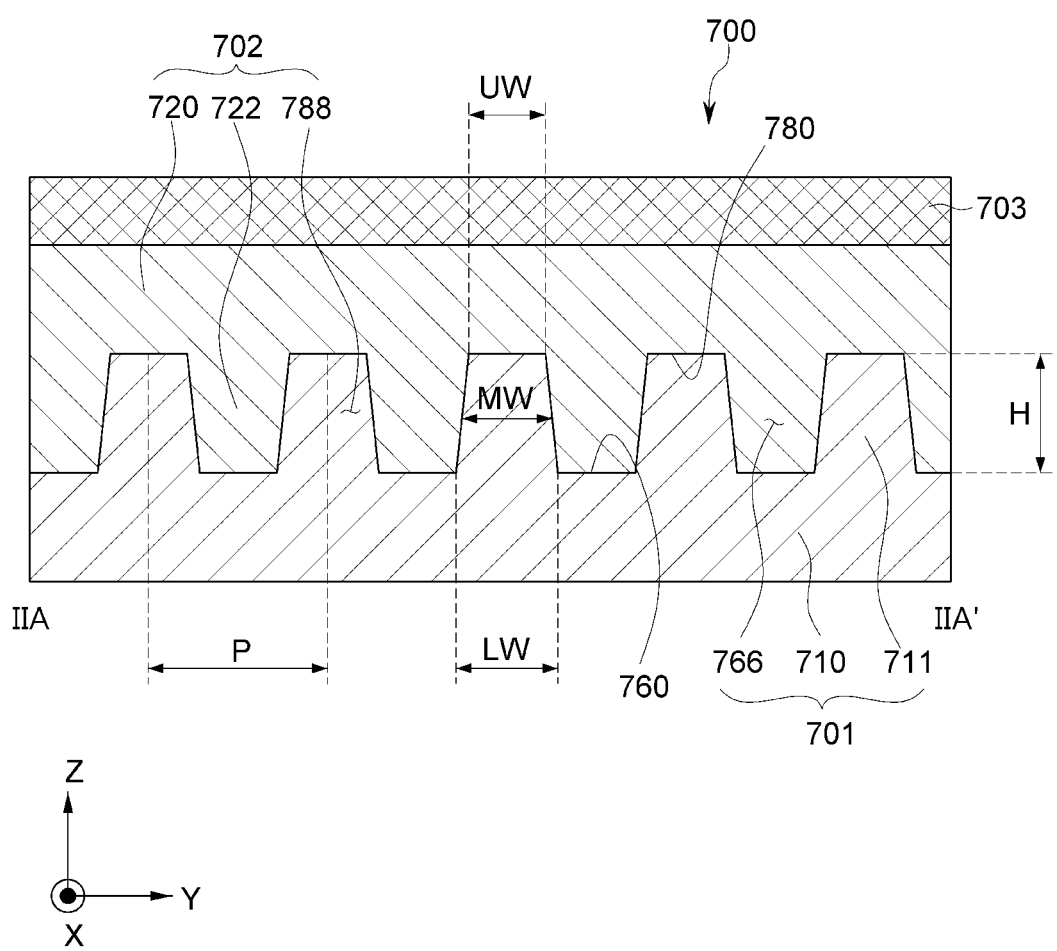
FIG. 4 is a cross-sectional view taken along line IIA-IIA' in FIG. 3.

FIG. 3 is an exploded perspective view illustrating the optical film 700 of FIG. 2, and FIG. 4 is a cross-sectional view taken along line IIA-IIA' in FIG. 3.

The optical film 700 includes a first pattern layer 701, a second pattern layer 702, and a protective layer 703, as illustrated in FIGS. 3 and 4.

The first pattern layer 701 is disposed on the second polarizer 792 to be closer to the second polarizer 792 than the second pattern layer 702. In an embodiment, for example, the first pattern layer 701 is disposed between the second polarizer 792 and the second pattern layer 702. The first pattern layer 701 includes a base portion (hereinafter, "a first base portion 710") and a plurality of protruding portions (hereinafter, "first protruding portions 711"). The first base portion 710 may be integrally formed with the plurality of first protruding portions 711 to define a unitary structure. That is, one of the first base portion 710 and the first protruding portion 711 may extend to define the other one of the first base portion 710 and the first protruding portion 711. Such extending portions may also be used to define other unitary structures described herein.

The second pattern layer 702 is positioned on the first pattern layer 701. In an embodiment, for example, the second pattern layer 702 is disposed between the first pattern layer 701 and the protective layer 703. The second pattern layer 702 includes a base portion (hereinafter, "a second base portion 720") and a plurality of protruding portions (hereinafter, "second protruding portions 722"). The second base portion 720 may be integrally formed with the plurality of second protruding portions 722 to define a unitary structure, as similarly described above for the first pattern layer 701.

Facing surfaces of the first base portion 710 and the second base portion 720 are defined as inner surfaces 760 and 780 of the corresponding base portions 710 and 720, a surface of the first base portion 710 opposite to the inner surface 760 of the first base portion 710 is defined as an outer surface of the first base portion 710, and a surface of the second base portion 720 opposite to the inner surface 780 of the second base portion 720 is defined as an outer surface of the second base portion 720. The inner surfaces 760 and 780 may be respectively virtually extended in the X-axis and Y-axis directions, such as to define a plane. Such virtually-extended inner surfaces 760 and 780 are common to each of the respective protruding portions of the pattern layer. That is, the first and second protruding portions 711 and 722 may be extended from a common inner surface of the respective pattern layer 701 and 702, such as from a common plane of the respective pattern layer 701 and 702.

The first protruding portions 711 of the first pattern layer 701 are disposed arranged separated from each other along the Y-axis direction. Each first protruding portion 711 has a length which extends along the X-axis direction, and a width which extends along the Y-axis direction. The plurality of first protruding portions 711 protrude from the first base portion 710 toward the second pattern layer 702. In an embodiment, for example, the plurality of first protruding portions 711 protrude from the inner surface 760 of the first base portion 710 along the Z-axis direction. The first protruding portion 711 may have a quadrangular cross-section. In an embodiment, for example, the first protruding portion 711 may have a trapezoidal cross-section.

The first protruding portions 711 may have substantially the same size and dimensions as each other. In an embodiment, for example, the first protruding portions 711 may have substantially same lengths L, substantially same heights H, and substantially same widths LW, MW, and UW. Herein, the length L of the first protruding portion 711 means a size of the first protruding portion 711 in the X-axis direction, the height H of the first protruding portion 711 means a size of the first protruding portion 711 in the Z-axis direction, and the widths LW, MW, and UW of the first protruding portions 711 mean sizes of the first protruding portions 711 in the Y-axis direction. In such an embodiment, the widths LW, MW, and UW of the first protruding portions 711 may be classified into a lower width LW, a middle width MW, and an upper width UW.

The lower width LW of the first protruding portion 711 means a length of one of two sides facing each other in the Z-axis direction, of the first protruding portion 711, that is closer to the first base portion 710. The upper width UW of the first protruding portion 711 means a length of the other of the two sides facing each other in the Z-axis direction, of the first protruding portion 711, that is further away from the first base portion 710. The middle width MW of the first protruding portion 711 means a length of a segment connecting center points of two sides of the first protruding portion 711 that face each other in the Y-axis direction.

The middle width MW of the first protruding portion 711 and a distance (or gap) between adjacent ones of the first protruding portions 711 may be substantially the same as each other. In other words, the middle width MW of the first protruding portion 711 and a middle width of the second protruding portion 722 may be substantially the same as each other.

A pitch P (or period) of the first protruding portions 711 may be substantially the same as each other. Herein, the pitch P of the first protruding portions 711 may be defined as a distance between center portions of the first protruding portions 711 that are adjacent to each other along the Y-axis direction. The center portion of the first protruding portion 711 means a portion located at a half point of the width (e.g., the upper width UW) of the first protruding portion 711. On the other hand, the pitch P of the first protruding portions 711 may be defined as a distance between mutually corresponding sides of the first protruding portions 711 that are adjacent to each other. In an embodiment, for example, the pitch P may be defined as a distance between a left side of one of the first protruding portions 711 and a left side of another of the first protruding portions 711 that is adjacent to the one of the first protruding portions 711 in FIG. 4. The left sides are arranged along the Y-axis direction.

The distance (or gap) between adjacent ones of the first protruding portions 711 may be substantially the same as each other. In an embodiment, for example, when three sequential adjacent first protruding portions 711 are defined as a left protruding portion, a center protruding portion adjacent to the left protruding portion, and a right protruding portion adjacent to the center protruding portion, respectively, a distance (or gap) between the left protruding portion and the center protruding portion may be substantially the same as a distance (or gap) between the center protruding portion and the right protruding portion.

The second protruding portions 722 of the second pattern layer 702 are disposed arranged separated from each other along the Y-axis direction. Each second protruding portion 722 has a length which extends along the X-axis direction, and a width which extends along the Y-axis direction. The plurality of second protruding portions 722 protrude from the second base portion 720 toward the first pattern layer 701. In an embodiment, for example, the plurality of second protruding portions 722 protrude from the inner surface 780 of the second base portion 720 toward a direction opposite to the Z-axis direction (hereinafter, "−Z-axis direction"). The second protruding portion 722 may have a quadrangular cross-section. In an embodiment, for example, the second protruding portion 722 may have a trapezoidal cross-section.

The second protruding portions 722 may have substantially the same size and dimensions as each other. In an embodiment, for example, the second protruding portions 722 may have substantially same lengths, substantially same heights, and substantially same widths. Herein, the length of the second protruding portion 722 means a size of the second protruding portion 722 in the X-axis direction, the height of the second protruding portion 722 means a size of the second protruding portion 722 in the Z-axis direction, and the widths of the second protruding portions 722 mean sizes of the second protruding portions 722 in the Y-axis direction. In such an embodiment, the widths of the second protruding portions 722 may be classified into a lower width, a middle width, and an upper width. The lower width of the second protruding portion 722 means a length of one of two sides facing each other in the Z-axis direction, of the second protruding portion 722, that is closer to the second base portion 720. The upper width UW of the second protruding portion 722 means a length of the other of the two sides facing each other in the Z-axis direction, of the second protruding portion, 722 that is further away from the second base portion 720. The middle width MW of the second protruding portion 722 means a length of a segment connecting center points of two sides of the second protruding portion 722 that face each other in the Y-axis direction.

The middle width MW of the second protruding portion 722 and a distance (or gap) between adjacent ones of the second protruding portions 722 may be substantially the same as each other. In other words, the middle width of the second protruding portion 722 and the middle width MW of the first protruding portion 711 may be substantially the same as each other.

A pitch P (or period) of the second protruding portions 722 may be substantially the same as each other. Here, the pitch P of the second protruding portions 722 may be defined as a distance between center portions of the second protruding portions 722 that are adjacent to each other along the Y-axis direction. The center portion of the second protruding portion 722 means a portion located at a half point of the width (e.g., the upper width) of the second protruding portion 722. On the other hand, the pitch P of the second protruding portions 722 may be defined as a distance between mutually corresponding sides of the second protruding portions 722 that are adjacent to each other. In an embodiment, for example, the pitch P may be defined as a distance between a left side of one of the second protruding portions 722 and a left side of another of the second protruding portions 722 that is adjacent to the one of the second protruding portions 722 in FIG. 4. The left sides are arranged along the Y-axis direction.

The distance (or gap) between adjacent ones of the second protruding portions 722 may be substantially the same as each other. In an embodiment, for example, when three sequential adjacent second protruding portions 722 are defined as a left protruding portion, a center protruding portion adjacent to the left protruding portion, and a right protruding portion adjacent to the center protruding portion, respectively, a distance (or gap) between the left protruding portion and the center protruding portion may be substantially the same as a distance (or gap) between the center protruding portion and the right protruding portion.

A size of the first protruding portion 711 and a size of the second protruding portion 722 may be substantially the same as each other. In an embodiment, for example, the length L, the height H and the widths LW, MW, and UW of the first protruding portion 711 may be substantially the same as the length, the height, and the widths of the second protruding portion 722, respectively.

The pitch P of the first protruding portions 711 and the pitch of the second protruding portions 722 may be substantially the same as each other. Lengths or length extension directions of the first protruding portions 711 and the second protruding portions 722 may be parallel to each other, without being limited thereto.

Within the optical film 700, the first protruding portions 711 and the second protruding portions 722 are disposed alternately along the Y-axis direction. In an embodiment, for example, when defining a space between two first protruding portions 711 that are disposed adjacent to each other in the Y-axis direction as a groove 766 of the first pattern layer 701, the second protruding portion 722 is disposed (or inserted) in the groove 766 of the first pattern layer 701. In addition, when defining a space between two second protruding portions 722 that are disposed adjacent to each other in the Y-axis direction as a groove 788 of the second pattern layer 702, the first protruding portion 711 is disposed (or inserted) in the groove 788 of the second pattern layer 702.

The groove 766 of the first pattern layer 701 has a shape substantially the same as a shape of the second protruding portions 722 of the second pattern layer 702, and the groove 788 of the second pattern layer 702 has a shape substantially the same as a shape of the first protruding portion 711 of the first pattern layer 701.

The first protruding portion 711 may have a width that gradually decreases along a direction from the first base portion 710 toward the second base portion 720 (e.g., the Z-axis direction). In contrast, the second protruding portion 722 may have a width that gradually increases along a direction from the first base portion 710 toward the second base portion 720 (e.g., the Z-axis direction).

The first pattern layer 701 and the second pattern layer 702 may have different refractive indices. In an embodiment, for example, the refractive index of the second pattern layer 702 may be greater than the refractive index of the first pattern layer 701. In addition, alternatively, the refractive index of the second pattern layer 702 may be less than the refractive index of the first pattern layer 701.

A pattern layer having a relatively large refractive index (hereinafter, "a high refractive index pattern layer") among the first pattern layer 701 and the second pattern layer 702 may include a material having a refractive index substantially equal to or greater than 1.0. Specifically, the high refractive index pattern layer may include a material having a refractive index in a range from about 1.50 to about 1.60. In an embodiment, for example, the high refractive index pattern layer may include an ultraviolet ("UV") curable material including at least one of a (meth) acrylic resin, a polycarbonate-based resin, a silicon-based resin, and an epoxy-based resin.

A pattern layer having a relatively small refractive index (hereinafter, "a low refractive index pattern layer") among the first pattern layer 701 and the second pattern layer 702 may have a refractive index of less than about 1.50. Specifically, the low refractive index pattern layer may include a material having a refractive index substantially equal to or greater than 1.35 and less than about 1.50. In an embodiment, for example, the low refractive index pattern layer may include a UV-curable transparent resin. As a specific example, the low refractive index pattern layer may include a UV-curable material including at least one of a (meth) acrylic resin, a polycarbonate-based resin, a silicon-based resin, and an epoxy-based resin.

At least one of the high refractive index pattern layer and the low refractive index pattern layer may include a light diffusing agent. A left and right viewing angle in the horizontal direction and an up and down viewing angle in the vertical direction of the screen of the display device may be simultaneously improved by the pattern layer including the light diffusing agent included in a pattern layer. The light diffusing agent may include an organic light diffusing agent, an inorganic light diffusing agent, or a combination thereof. The combination of the organic light diffusing agent and the inorganic light diffusing agent may improve the diffusibility and transmittance of the low refractive index pattern layer or the high refractive index pattern layer.

The organic light diffusing agent may include one or more of (meth) acrylic-based particles, siloxane-based particles, and styrene-based particles. The inorganic light diffusing agent may include at least one of calcium carbonate, barium sulfate, titanium dioxide, aluminum hydroxide, silica, glass, talc, mica, white carbon, magnesium oxide and zinc oxide. In particular, the inorganic light diffusing agent is more effective in reducing or effectively preventing a decrease in whiteness and in increasing light diffusibility as compared with the organic light diffusing agent.

A shape and a particle diameter (or particle size) of the light diffusing agent are not limited to any particular shape and numerical value. In an embodiment, for example, the light diffusing agent may include spherical cross-linked particles, and an average particle diameter may be in a range from about 0.1 micrometer ($\mu$m) to about 30 micrometers ($\mu$m), specifically, in a range from about 0.5 $\mu$m to about 10 and more specifically in a range from about 1 $\mu$m to about 5 $\mu$m. Within the aforementioned range, the be realized. The light diffusing agent may be included in the high refractive index pattern layer alone, the low refractive index pattern layer alone, or both of the high refractive index pattern layer and the low refractive index pattern layer. The light diffusing agent in a pattern layer may be present in an amount in a range from about 0.1 wt % to about 20 wt %, and specifically in a range from about 1 wt % to about 15 wt %, with respect to a total weight of the pattern layer. Within the aforementioned range, a light diffusion effect may be improved.

As illustrated in FIG. 4, an interface (e.g., a contact interface) between the first pattern layer 701 and the second pattern layer 702 may have a concavo-convex shape (or a zigzag shape).

The protective layer 703 is disposed on the second pattern layer 702. In an embodiment, for example, the protective layer 703 is disposed on the outer surface of the second pattern layer 702. The protective layer 703 protects and supports the first pattern layer 701 and the second pattern layer 702.

The protective layer 703 may have a cross-sectional thickness (e.g., along the Z-axis direction) substantially equal to or greater than about 10,000 nanometers (nm), specifically greater than about 10,000 nm, and more specifically, in a range from about 10,100 nm to about 15,000 nm. Within the aforementioned range, rainbow stains may be reduced or effectively prevented.

The protective layer 703 may be a film including a monoaxially or biaxially stretched optically transparent resin. In an embodiment, for example, the optically transparent resin may include at least one selected from polyester including, for example, polyethylene terephthalate ("PET"), polybutylene terephthalate, polyethylene naphthalate, and polybutylene naphthalate, acryl, cyclic olefin polymer ("COP"), cellulose ester including, for example, triacetyl cellulose ("TAC"), polyvinyl acetate, polyvinyl chloride ("PVC"), polynorbornene, polycarbonate ("PC"), polyamide, polyacetal, polyphenylene ether, polyphenylene sulfide, polysulfone, polyether sulfone, polyarylate, and polyimide.

The protective layer 703 may include a film produced after modifying the aforementioned optically transparent resin. Such modification may include copolymerization, branching, cross-linking, or molecular terminal modification, and the like.

Figure 5:
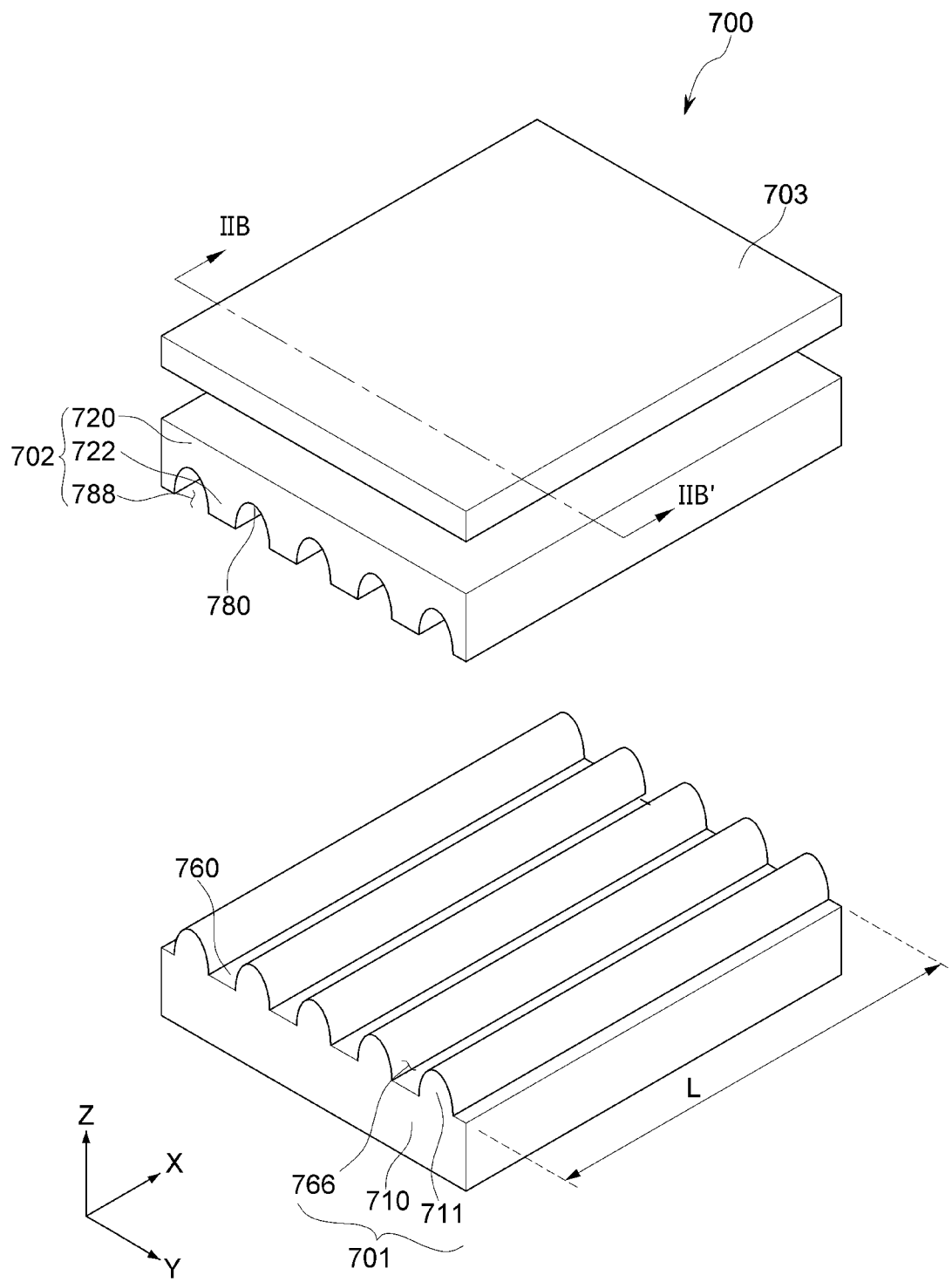
FIG. 5 is an exploded perspective view illustrating another embodiment of the optical film of FIG. 2.
Figure 6:
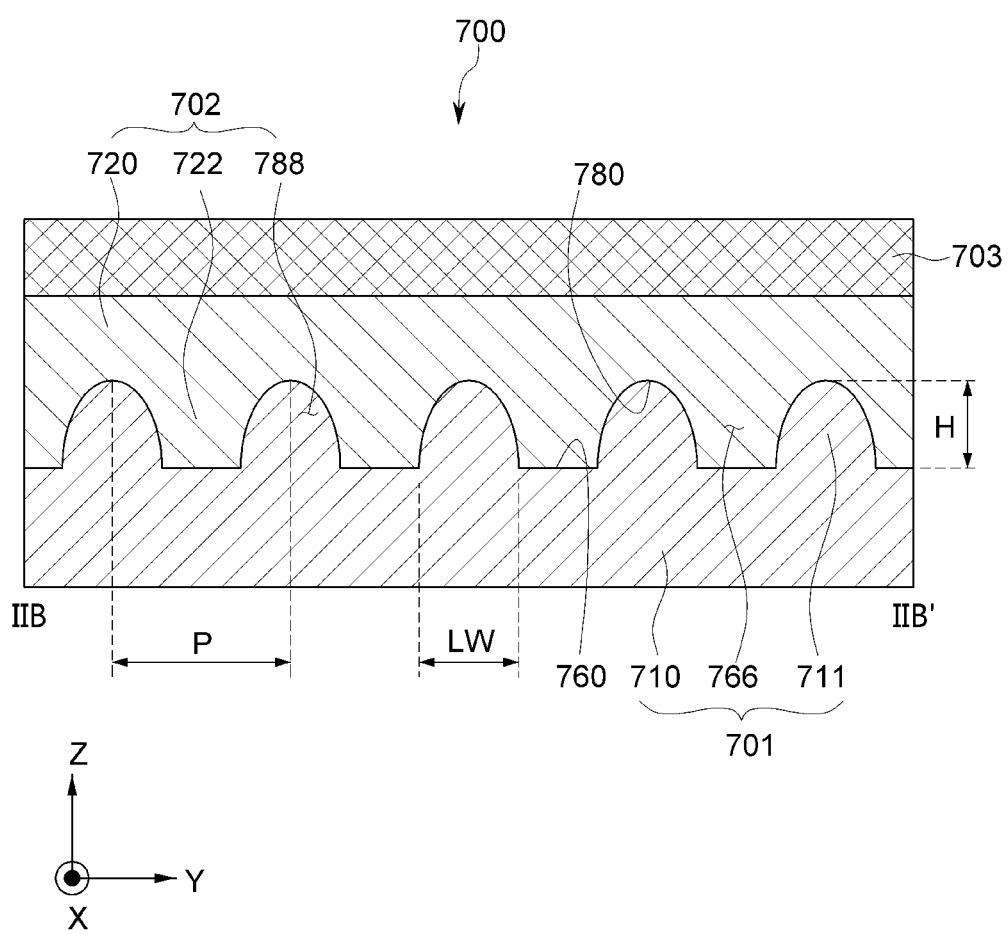
FIG. 6 is a cross-sectional view taken along line IIB-IIB' in FIG. 5.

FIG. 5 is an exploded perspective view illustrating another embodiment of the optical film of FIG. 2, and FIG. 6 is a cross-sectional view taken along line IIB-IIB' in FIG. 5.

An optical film 700 includes a first pattern layer 701, a second pattern layer 702, and a protective layer 703, as illustrated in FIGS. 5 and 6.

The optical film 700 of FIG. 5 is different from the optical film 700 of FIG. 3 described above only in the shape of protruding portions and grooves, and the remaining structure is substantially the same as that of the optical film 700 of FIG. 3.

A first protruding portion 711 of FIG. 5 may have a parabolic cross-section shape. In addition, the first protruding portion 711 may have a semicircular or convex lens-shaped cross-section shape.

In FIG. 5, at least one of sides of a second protruding portion 722 that face each other in the Y-axis direction has a concave round shape.

In FIG. 5, a groove 766 between adjacent ones of the first protruding portions 711 has a shape substantially the same as a shape of the second protruding portion 722, and a groove 788 between adjacent ones of the second protruding portions 722 has a shape substantially the same as a shape of the first protruding portion 711.

Figure 7:
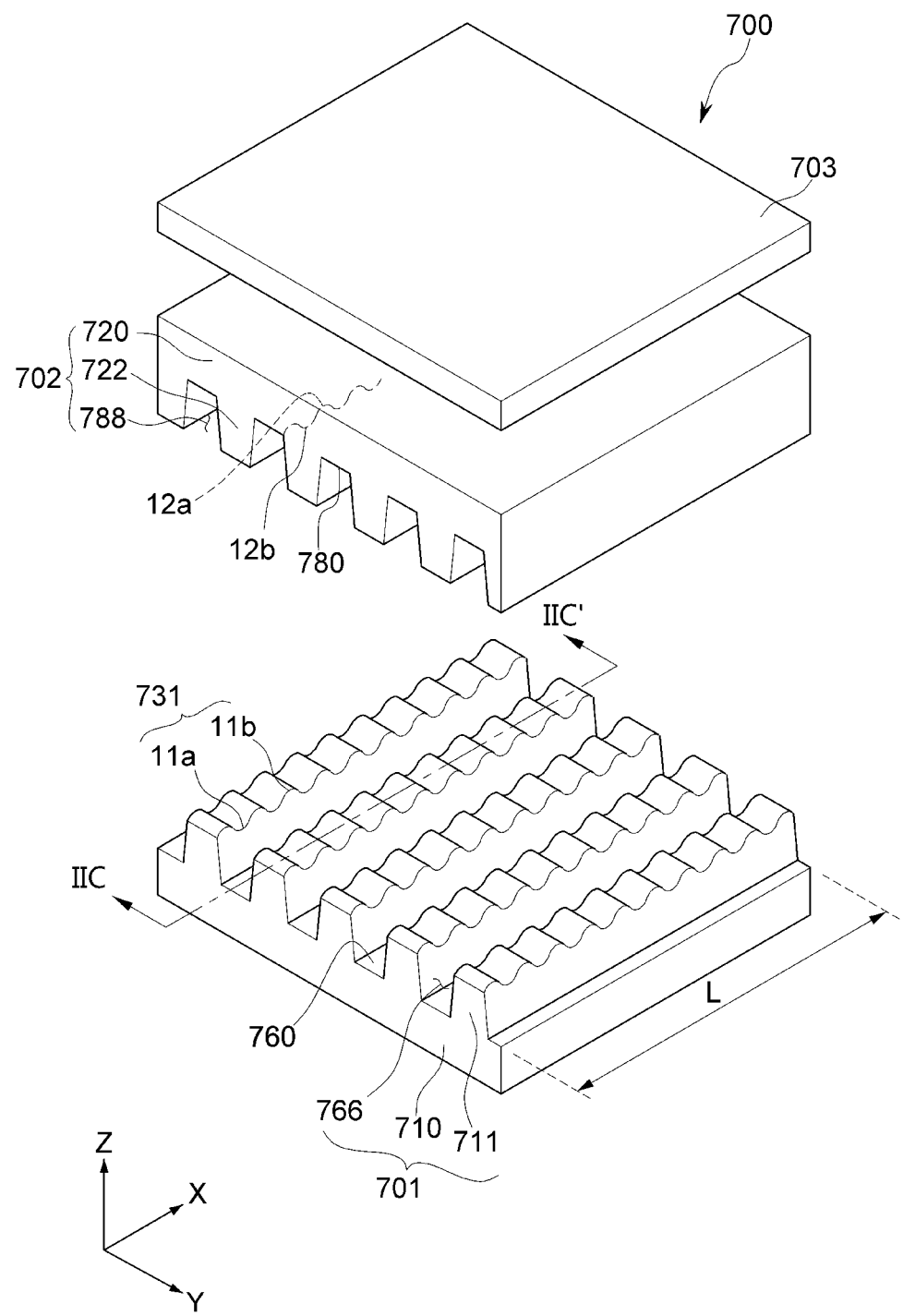
FIG. 7 is an exploded perspective view illustrating still another embodiment of the optical film of FIG. 2.
Figure 8:
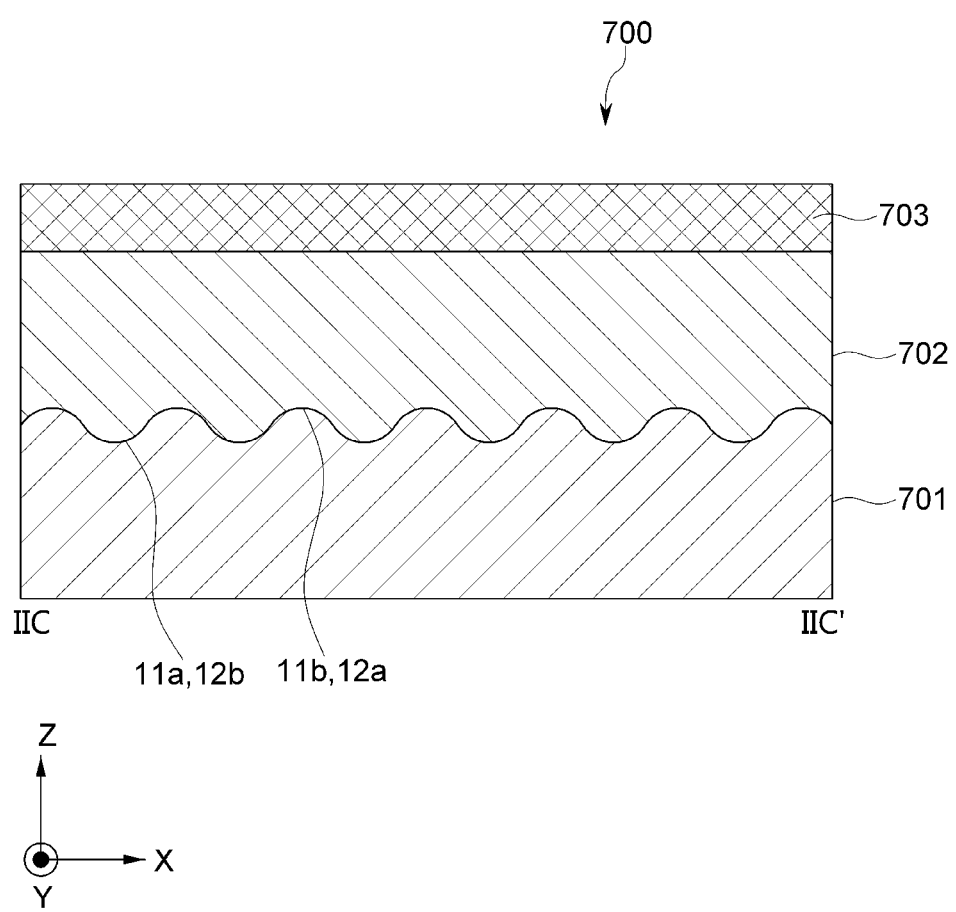
FIG. 8 is a cross-sectional view taken along line IIC-IIC' in FIG. 7.

FIG. 7 is an exploded perspective view illustrating still another embodiment of the optical film of FIG. 2, and FIG. 8 is a cross-sectional view taken along line IIC-IIC' in FIG. 7.

An optical film 700 includes a first pattern layer 701, a second pattern layer 702, and a protective layer 703, as illustrated in FIGS. 7 and 8.

The optical film 700 of FIG. 7 further includes a concavo-convex shape along a length of a protruding portion as compared with the optical film 700 of FIG. 3 described above. The remaining structure of the optical film 700 of FIG. 7 is substantially the same as that of the optical film 700 of FIG. 3.

As illustrated in FIGS. 7 and 8, an upper surface 731 of the first protruding portion 711 has a concavo-convex shape. The upper surface 731 of a first protruding portion 711 means one of surfaces of the first protruding portion 711 that faces a second pattern layer 702 and that is farthest from the first base portion 710. In such an embodiment, a concave portion 11a and a convex portion 11b of the upper surface 731 are disposed along a length direction (e.g., the X-axis direction) of the first protruding portion 711. In other words, the concave portion 11a and the convex portion 11b of the upper surface 731 are arranged in a direction intersecting an arrangement direction of the first protruding portions 711.

As the upper surface of the first protruding portion 711 has the concavo-convex shape, an inner surface 780 of the second pattern layer 702 that faces the upper surface 731 also has a concavo-convex shape as illustrated by the dotted line in FIG. 7. In such an embodiment, the convex portion 11b of the first protruding portion 711 is inserted into a concave portion 12a of the second pattern layer 702, and a convex portion 12b of the second pattern layer 702 is inserted into the concave portion 11b of the first protruding portion 711.

Each of the concave portions 11a and 12a may have a concave round shape, and each of the convex portions 11b and 12b may have a convex round shape.

In addition, as illustrated in FIG. 7, a concave portion 11a of an upper surface 731 of one of the first protruding portions 711 may be disposed corresponding to a concave portion 11a of an upper surface 731 of another of the first protruding portions 711 that is adjacent to the one of the first protruding portions 711. Similarly, a convex portion 11b of an upper surface 731 of one of the first protruding portions 711 may be disposed corresponding to a convex portion 11b of an upper surface 731 of another of the first protruding portions 711 that is adjacent to the one of the first protruding portions 711. In other words, the concave portions 11a of the upper surfaces 731 may be disposed along the arrangement direction (e.g., the Y-axis direction) of the first protruding portions 711. In addition, the convex portions 11b of the upper surfaces 731 may be disposed along the arrangement direction (e.g., the Y-axis direction) of the first protruding portions 711.

On the other hand, conversely, a concave portion 11a of an upper surface 731 of one of the first protruding portions 711 may be disposed corresponding to a convex portion 11b of an upper surface 731 of another of the first protruding portions 711 that is adjacent to the one of the first protruding portions 711. Similarly, a convex portion 11b of an upper surface 731 of one of the first protruding portions 711 may be disposed corresponding to a concave portion 11a of an upper surface 731 of another of the first protruding portions 711 that is adjacent to the one of the first protruding portions 711. In other words, the concave portion 11a and the convex portion 11b of the upper surfaces 731 may be disposed alternately along the arrangement direction (e.g., the Y-axis direction) of the first protruding portions 711.

Figure 9:
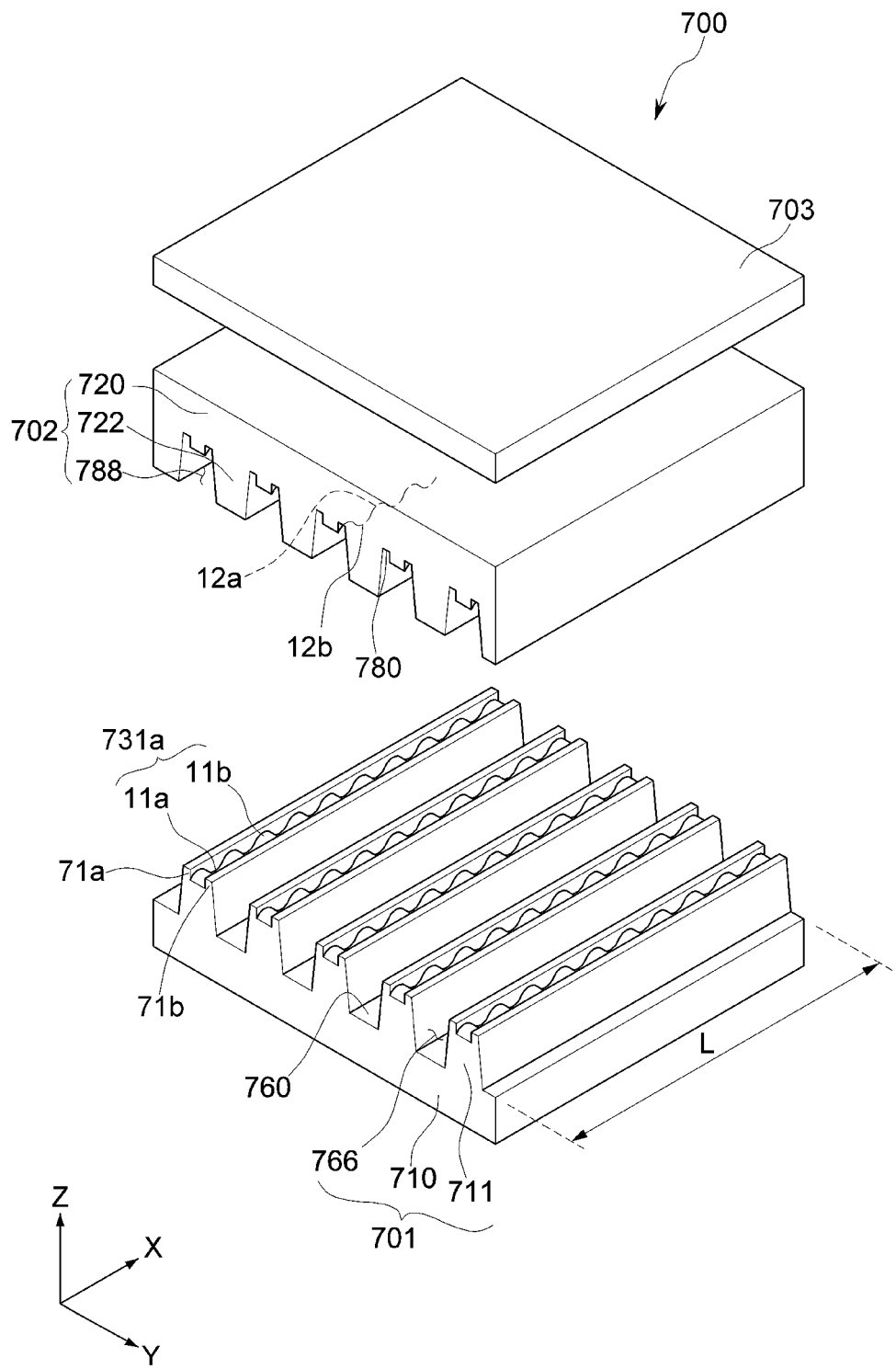
FIG. 9 is an exploded perspective view illustrating yet another embodiment of the optical film of FIG. 2.

FIG. 9 is an exploded perspective view illustrating yet another embodiment of the optical film of FIG. 2.

An optical film 700 includes a first pattern layer 701, a second pattern layer 702, and a protective layer, as illustrated in FIG. 9.

The optical film 700 of FIG. 9 further includes a first projection 71a, a second projection 71b, and a concavo-convex shape 11a and 11b, as compared to the optical film 700 of FIG. 3 described above. The remaining structure of the optical film of FIG. 9 is the same as that of the optical film 700 of FIG. 3.

As illustrated in FIG. 9, the first pattern layer 701 may further include the first projection 71a and the second projection 71b that protrude from a common plane at a distal end (e.g., an upper surface 731a) of at least one first protruding portion 711. The first projection 71a and the second projection 71b may define a recess between the first projection 71a and the second projection 71b, where the concavo-convex shape 11a and 11b is disposed in such recess. The first projection 71a is disposed at a first side edge of an upper surface 731a of the first protruding portion 711, and the second projection 71b is disposed at a second side edge of the upper surface 731a of the first protruding portion 711 which faces the first side edge. The first and second side edges of the upper surface 731a face each other in the Y-axis direction. The first projection 71a protrudes toward the second pattern layer 702 from the first side edge, and the second projection 71b protrudes toward the second pattern layer 702 from the second side edge. In other words, the first projection 71a protrudes along the Z-axis direction at the first side edge, and the second projection 71b protrudes along the Z-axis direction at the second side edge. The first projection 71a and the second projection 71b face each other in the Y-axis direction.

The upper surface 731a between the first projection 71a and the second projection 71b has a concavo-convex shape along the length of the first protruding portion 711. The concavo-convex shape protrudes from a same common plane from which the first projection 71a and the second projection 71b protrude. The upper surface 731a of the first protruding portion 711 means ones of surfaces of the first protruding portion 711 that faces the second pattern layer 702. That is, a collective upper surface 731a may be defined by portions of the first projection 71a, the second projection 71b and the concavo-convex shape 11a and 11b. In such an embodiment, a concave portion 11a and a convex portion 11b of the upper surface 731a are disposed along a longitudinal direction (e.g., the X-axis direction) of the first protruding portion 711. In other words, the concave portion 11a and the convex portion 11b of the upper surface 731a are disposed in a direction intersecting an arrangement direction of the first protruding portions 711.

A collective inner surface 780 of the second pattern layer 702 may include portions corresponding to the first projection 71a, the second projection 71b and the concavo-convex shape 11a and 11b of the first pattern layer 701. As the upper surface 731a of the first protruding portion 711 has the concavo-convex shape, the collective inner surface 780 of the second pattern layer 702 that faces the upper surface 731a also has a concavo-convex shape. In such an embodiment, the convex portion 11b of the first protruding portion 711 is inserted into a concave portion 12a of the second pattern layer 702, and a convex portion 12b of the second pattern layer 702 is inserted into the concave portion 11b of the first protruding portion 711. Along the Y-axis direction, the inner surface 780 of the second pattern layer 702 may include a recess shape corresponding to the shape of the first projection 71a and the second projection 71b of the first pattern layer 701.

Each of the concave portions 11a and 12a may have a concave round shape, and each of the convex portions 11b and 12b may have a convex round shape.

In addition, as illustrated in FIG. 9, a concave portion 11a of an upper surface 731a of one of the first protruding portions 711 may be disposed corresponding to a concave portion 11a of an upper surface 731a of another of the first protruding portions 711 that is adjacent to the one of the first protruding portions 711. Similarly, a convex portion 11b of an upper surface 731a of one of the first protruding portions 711 may be disposed corresponding to a convex portion 11b of an upper surface 731a of another of the first protruding portions 711 that is adjacent to the one of the first protruding portions 711. In other words, the concave portions 11a of the upper surfaces 731a may be disposed along the arrangement direction (e.g., the Y-axis direction) of the first protruding portions 711. In addition, the convex portions 11b of the upper surfaces 731a may be disposed along the arrangement direction (e.g., the Y-axis direction) of the first protruding portions 711.

On the other hand, conversely, a concave portion 11a of an upper surface 731a of one of the first protruding portions 711 may be disposed corresponding to a convex portion 11b of an upper surface 731a of another of the first protruding portions 711 that is adjacent to the one of the first protruding portions 711. Similarly, a convex portion 11b of an upper surface 731a of one of the first protruding portions 711 may be disposed corresponding to a concave portion 11a of an upper surface 731a of another of the first protruding portions 711 that is adjacent to the one of the first protruding portions 711. In other words, the concave portion 11a and the convex portion 11b of the upper surfaces 731a may be disposed alternately along the arrangement direction (e.g., the Y-axis direction) of the first protruding portions 711.

Figure 10:
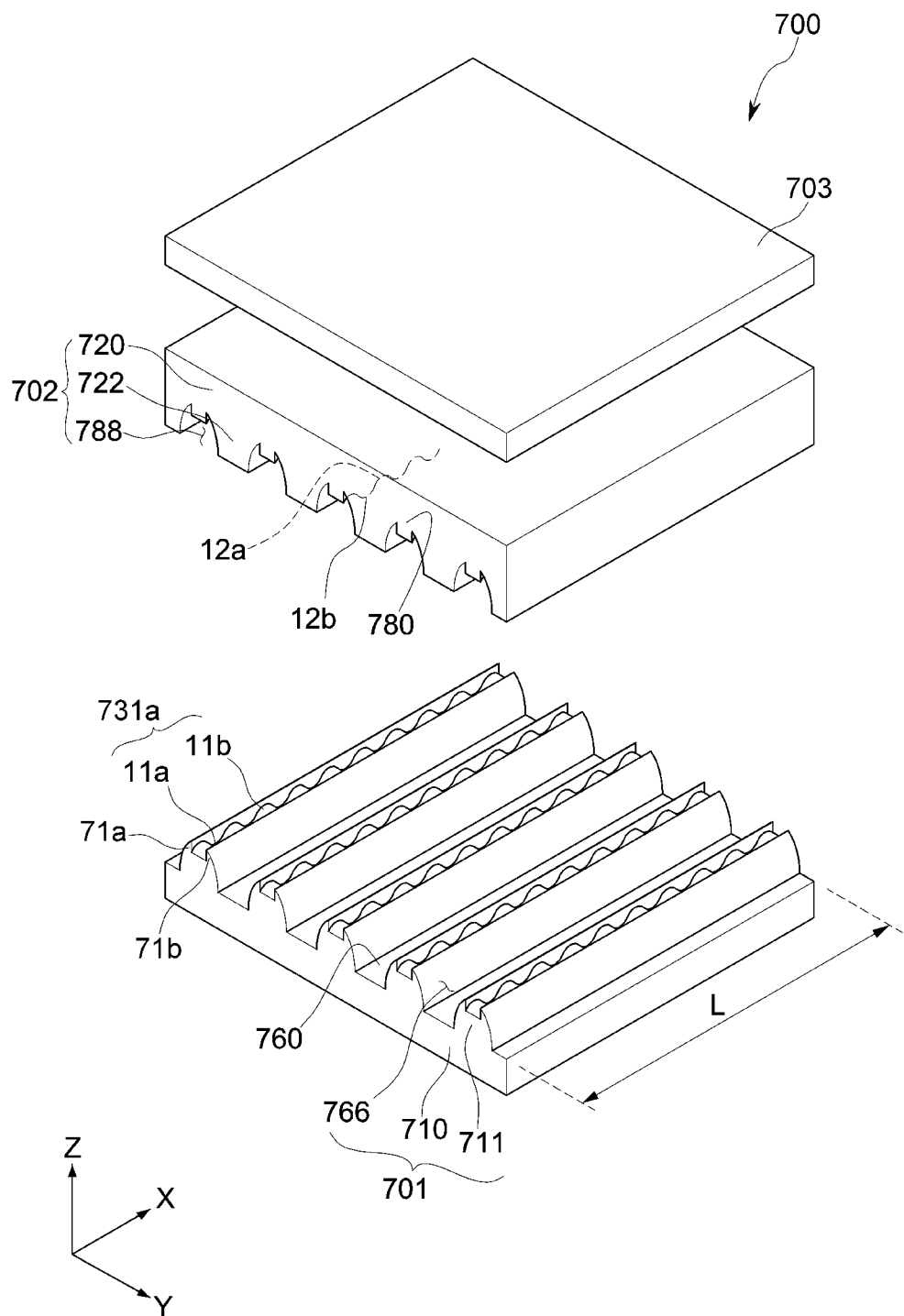
FIG. 10 is an exploded perspective view illustrating yet another embodiment of the optical film of FIG. 2.

FIG. 10 is an exploded perspective view illustrating yet another embodiment of the optical film of FIG. 2.

An optical film 700 includes a first pattern layer 701, a second pattern layer 702, and a protective layer 703, as illustrated in FIG. 10.

The optical film 700 of FIG. 10 further includes a first projection 71a, a second projection 71b, and a concavo-convex shape 11a and 11b, as compared to the optical film 700 of FIGS. 5 and 6 described above. The remaining structure of the optical film of FIG. 9 is the same as that of the optical film 700 of FIGS. 5 and 6.

As illustrated in FIG. 10, the first pattern layer 701 may further include the first projection 71a and the second projection 71b that protrude from a common plane at a distal end (e.g., an upper surface 731a) of at least one first protruding portion 711. The first projection 71a is disposed at a first side edge of an upper surface 731a of the first protruding portion 711, and the second projection 71b is disposed at a second side edge of the upper surface 731a of the first protruding portion 711 which faces the first side edge. The first and second side edges of the upper surface 731a face each other in the Y-axis direction. The first projection 71a protrudes toward the second pattern layer 702 from the first side edge, and the second projection 71b protrudes toward the second pattern layer 702 from the second side edge. In other words, the first projection 71a protrudes along the Z-axis direction at the first side edge, and the second projection 71b protrudes along the Z-axis direction at the second side edge. The first projection 71a and the second projection 71b face each other in the Y-axis direction.

When mutually facing surfaces of the first and second projections 71a and 71b are respectively defined as inner surfaces of the first projection 71a and the second projection 71b, respectively, a surface of the first projection 71a located opposite to the inner surface of the first projection 71a is defined as an outer surface of the first projection 71a, and a surface of the second projection 71b located opposite to the inner surface of the second projection 71b is defined as an outer surface of the second projection 71b, the outer surface of the first projection 71a and the outer surface of the second projection 71b may each have a round shape in cross-section.

The upper surface 731a between the first projection 71a and the second projection 71b has a concavo-convex shape along the length of the first protruding portion 711. The concavo-convex shape protrudes from a same common plane from which the first projection 71a and the second projection 71b protrude. The upper surface 731a of the first protruding portion 711 means ones of surfaces of the first protruding portion 711 that faces the second pattern layer 702. That is, a collective upper surface 731a may be defined by portions of the first projection 71a, the second projection 71b and the concavo-convex shape 11a and 11b. In such an embodiment, a concave portion 11a and a convex portion 11b of the upper surface 731a are disposed along a longitudinal direction (e.g., the X-axis direction) of the first protruding portion 711. In other words, the concave portion 11a and the convex portion 11b of the upper surface 731a are arranged in a direction intersecting an arrangement direction of the first protruding portions 711.

A collective inner surface 780 of the second pattern layer 702 may include portions corresponding to the first projection 71a, the second projection 71b and the concavo-convex shape 11a and 11b of the first pattern layer 701. As the upper surface 731a of the first protruding portion 711 has the concavo-convex shape, the collective inner surface 780 of the second pattern layer 702 that faces the upper surface 731a also has a concavo-convex shape. In such an embodiment, the convex portion 11b of the first protruding portion 711 is inserted into a concave portion 12a of the second pattern layer 702, and a convex portion 12b of the second pattern layer 702 is inserted into the concave portion 11b of the first protruding portion 711. Along the Y-axis direction, the inner surface 780 of the second pattern layer 702 may include a recess shape corresponding to the shape of the first projection 71a and the second projection 71b of the first pattern layer 701.

Each of the concave portions 11a and 12a may have a concave round shape, and each of the convex portions 11b and 12b may have a convex round shape.

In addition, as illustrated in FIG. 10, a concave portion 11a of an upper surface 731a of one of the first protruding portions 711 may be disposed corresponding to a concave portion 11a of an upper surface 731a of another of the first protruding portions 711 that is adjacent to the one of the first protruding portions 711. Similarly, a convex portion 11b of an upper surface 731a of one of the first protruding portions 711 may be disposed corresponding to a convex portion 11b of an upper surface 731a of another of the first protruding portions 711 that is adjacent to the one of the first protruding portions 711. In other words, the concave portions 11a of the upper surfaces 731a may be disposed along the arrangement direction (e.g., the Y-axis direction) of the first protruding portions 711. In addition, the convex portions 11b of the upper surfaces 731a may be disposed along the arrangement direction (e.g., the Y-axis direction) of the first protruding portions 711.

On the other hand, conversely, a concave portion 11a of an upper surface 731a of one of the first protruding portions 711 may be disposed corresponding to a convex portion 11b of an upper surface 731a of another of the first protruding portions 711 that is adjacent to the one of the first protruding portions 711. Similarly, a convex portion 11b of an upper surface 731a of one of the first protruding portions 711 may be disposed corresponding to a concave portion 11a of an upper surface 731a of another of the first protruding portions 711 that is adjacent to the one of the first protruding portions 711. In other words, the concave portion 11a and the convex portion 11b of the upper surfaces 731a may be disposed alternately along the arrangement direction (e.g., the Y-axis direction) of the first protruding portions 711.

Figure 11:
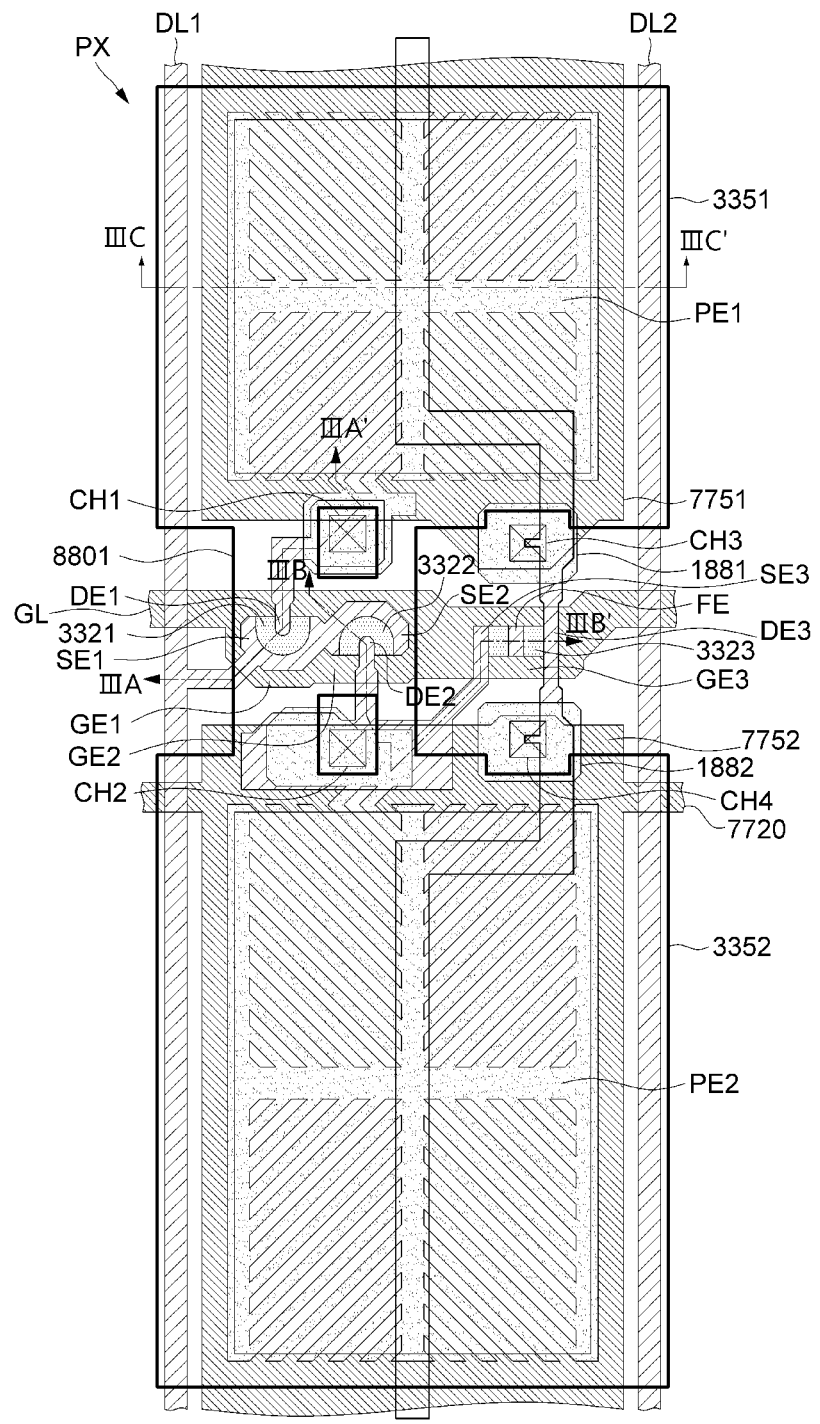
FIG. 11 is a top plan view illustrating an embodiment of one pixel included in a display panel illustrated in FIG. 1.
Figure 12:
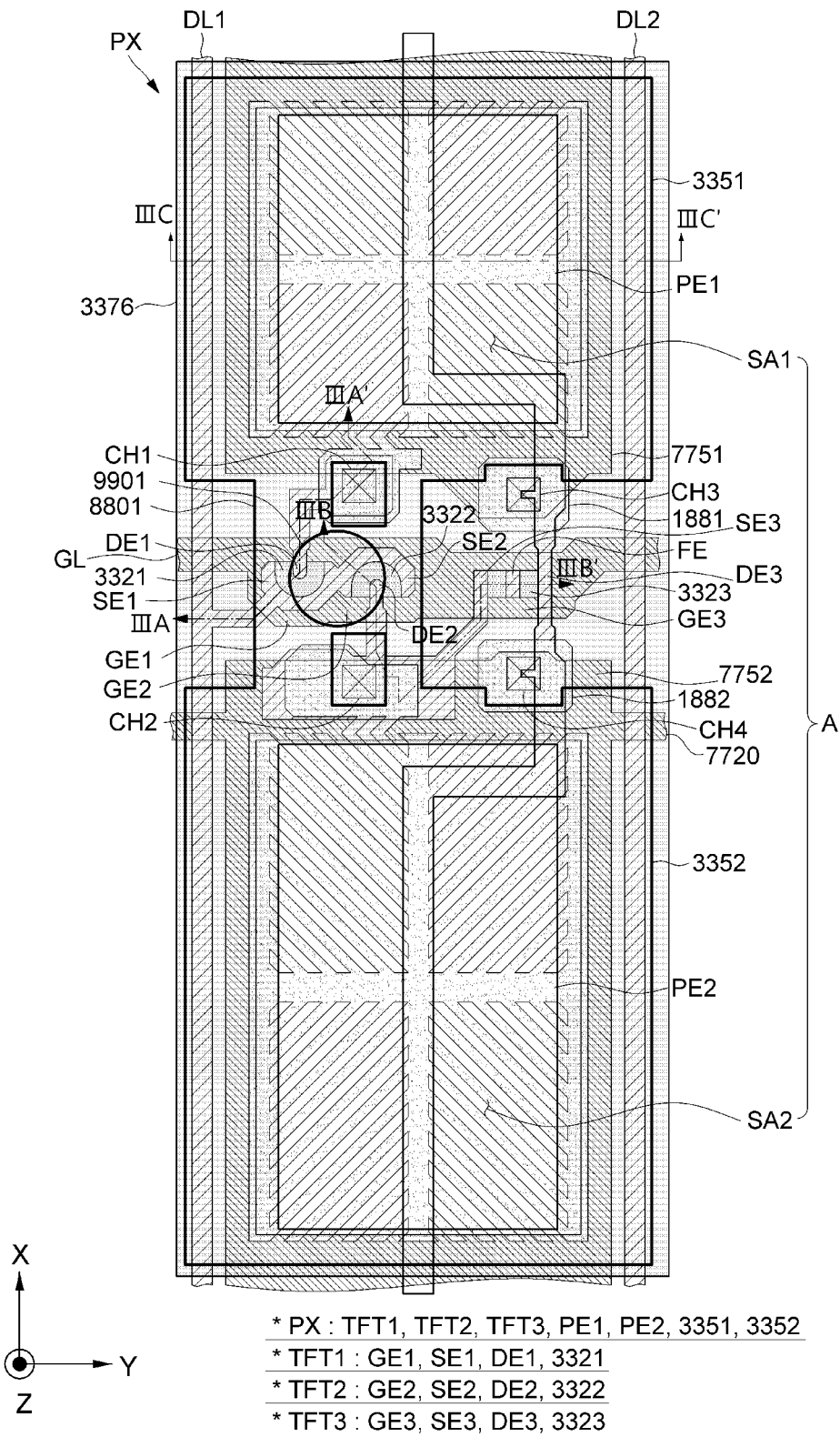
FIG. 12 is a top plan view illustrating a modified embodiment of the pixel structure of FIG. 11 in which a light blocking layer is further included.
Figure 13:
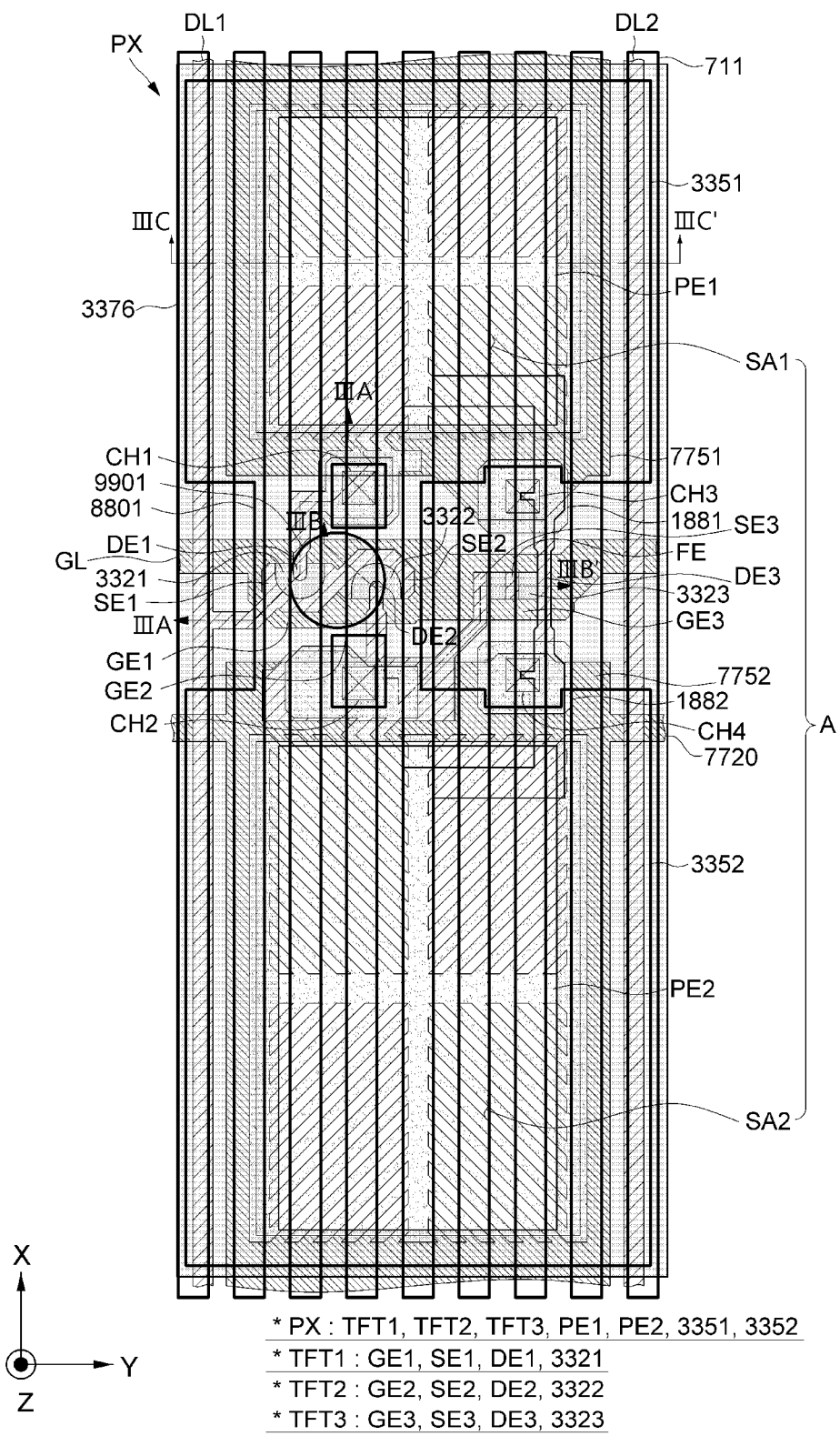
FIG. 13 is a top plan view illustrating a modified embodiment of the pixel structure of FIG. 12 in which a protruding portion of an optical film is further included.
Figure 14:
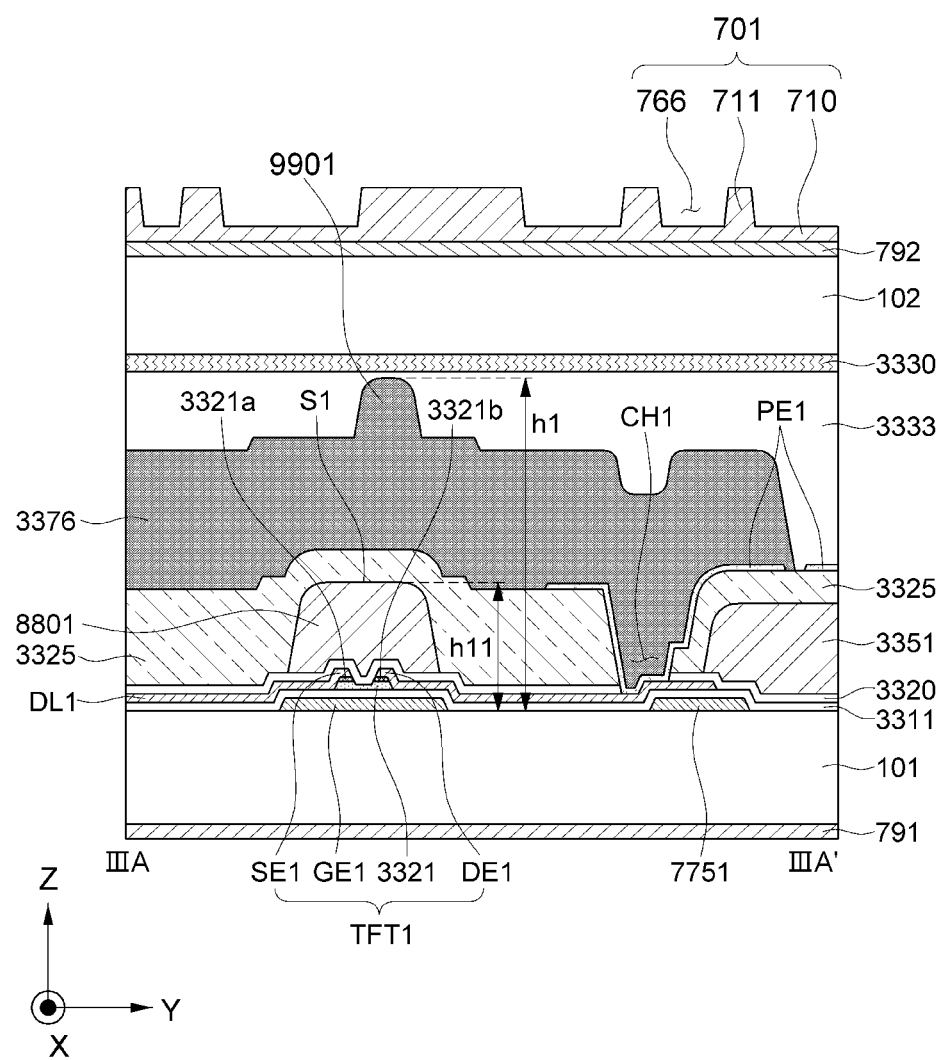
FIG. 14 is a cross-sectional view taken along line IIIA-IIIA' in FIG. 13.
Figure 15:
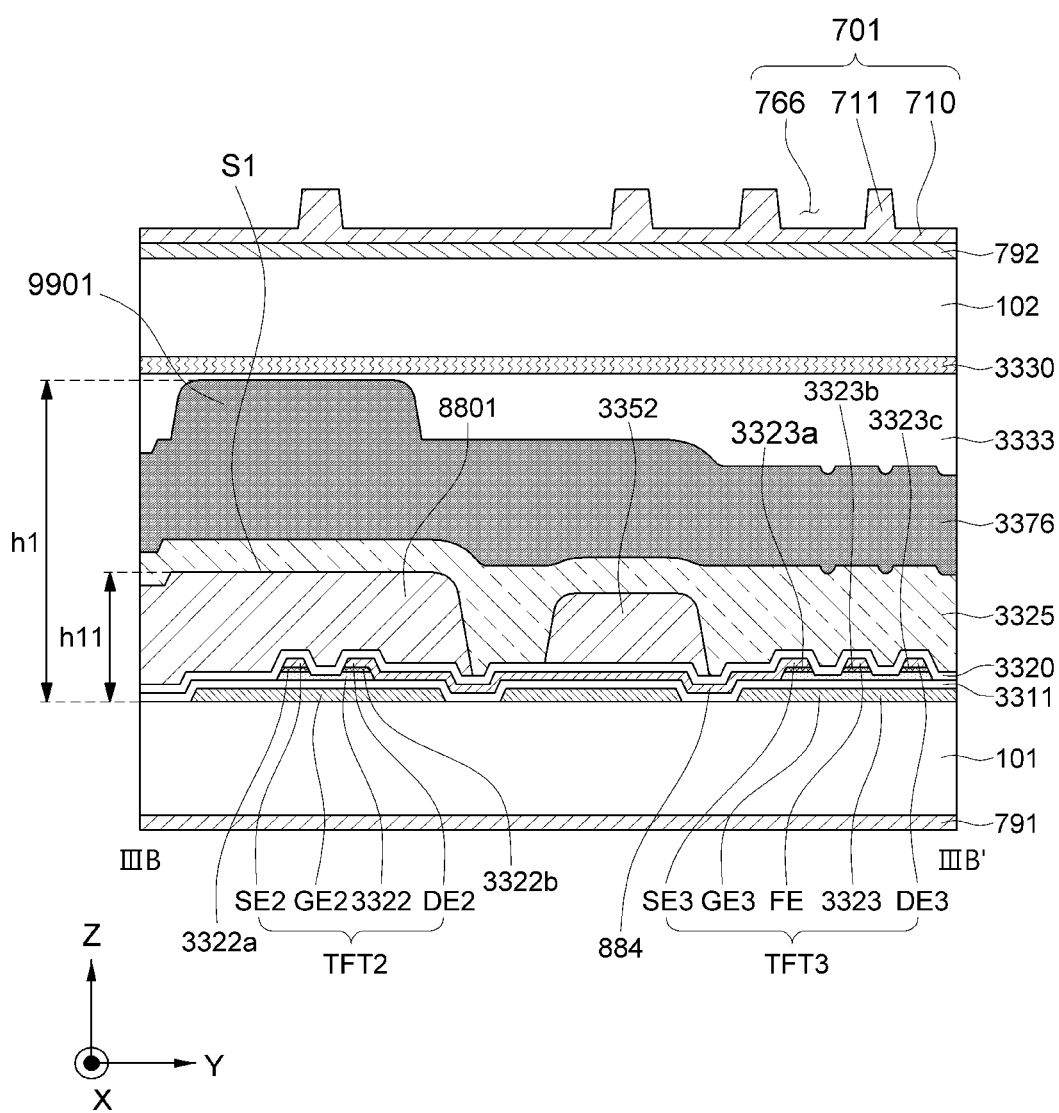
FIG. 15 is a cross-sectional view taken along line IIIB-IIIB' in FIG. 13.
Figure 16:
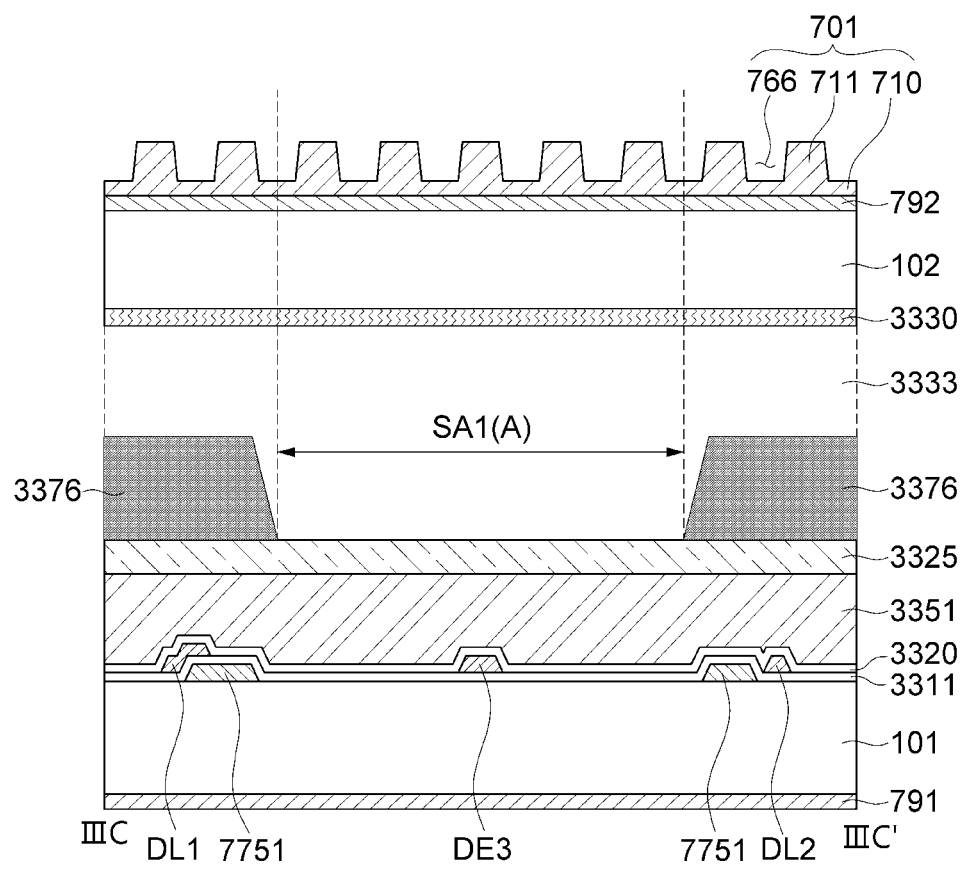
FIG. 16 is a cross-sectional view taken along line IIIC-IIIC' in FIG. 13.

FIG. 11 is a top plan view illustrating an embodiment of one pixel included in a display panel illustrated in FIG. 1, FIG. 12 is a top plan view illustrating a modified embodiment of the pixel structure of FIG. 11 in which a light blocking layer is further included, FIG. 13 is a top plan view illustrating a modified embodiment of the pixel structure of FIG. 12 in which a protruding portion of an optical film is further included, FIG. 14 is a cross-sectional view taken along line IIIA-IIIA' in FIG. 13, FIG. 15 is a cross-sectional view taken along line IIIB-IIIB' in FIG. 13, and FIG. 16 is a cross-sectional view taken along line IIIC-IIIC' in FIG. 13.

As illustrated in FIGS. 11 to 16, a pixel PX includes a first switching element TFT1, a second switching element TFT2, a third switching element TFT3, a first sub-pixel electrode PE1, a second sub-pixel electrode PE2, a first color filter layer 3351 and a second color filter layer 3352.

The first switching element TFT1 includes a first gate electrode GE1, a first semiconductor layer 3321, a first source electrode SE1 and a first drain electrode DE1. The first gate electrode GE is connected to a gate line GL, the first source electrode SE1 is connected to a data line DL1, and the first drain electrode DE is connected to the first sub-pixel electrode PE1.

The second switching element TFT2 includes a second gate electrode GE2, a second semiconductor layer 3322, a second source electrode SE2 and a second drain electrode DE2. The second gate electrode GE2 is connected to the gate line GL, the second source electrode SE2 is connected to the first source electrode SE1, and the second drain electrode DE2 is connected to the second sub-pixel electrode PE2.

The third switching element TFT3 includes a third gate electrode GE3, a third semiconductor layer 3323, a third source electrode SE3, a floating electrode FE and a third drain electrode DE3. The third gate electrode GE3 is connected to the gate line GL, the third source electrode SE3 is connected to the second drain electrode DE2, and the third drain electrode DE3 is connected to a first sustain electrode 7751 and a second sustain electrode 7752. In addition, the third drain electrode DE3 may extend further in the X-axis direction and overlap both of the first sub-pixel electrode PE1 and the second sub-pixel electrode PE2. In such an embodiment, the extended third drain electrode DE3 may overlap a center portion of the first sub-pixel electrode PE1 and a center portion of the second sub-pixel electrode PE2. In addition, the third drain electrode DE3 of one pixel PX may be connected to third drain electrodes DE3 of other pixels PX adjacent to the one pixel PX in the X-axis direction. In other words, the third drain electrodes DE3 of the pixels PX connected in common to one data line may be connected to each other. In such an embodiment, the third drain electrodes DE3 of the pixels PX connected in common to one data line may be integrally formed into a unitary structure.

The reference numerals 101 and 102 may indicate a base substrate (refer to FIGS. 14-16) or an overall display substrate (refer to FIGS. 1 and 2) in which a base substrate is disposed. The main structure of the pixel PX is located between a first substrate 101 and a second substrate 102. In other words, as illustrated in FIGS. 14 and 16, the display device includes the first substrate 101 and the second substrate 102 spaced apart from each other by a predetermined distance, and the first switching element TFT1, the second switching element TFT2, the third switching element TFT3, the first sub-pixel electrode PE1, the second sub-pixel electrode PE2, the first color filter layer 3351 and the second color filter layer 3352 are located between the first substrate 101 and the second substrate 102.

In addition, the gate line GL, a sustain line 7720, the first sustain electrode 7751, the second sustain electrode 7752, a gate insulating layer 3311, the data line DL1, a protective layer 3320, a dummy color filter layer 8801, an insulating interlayer 3325, a light blocking layer 3376, a column spacer 9901, an optical control layer such as a liquid crystal layer 3333 and a common electrode 3330 are located between the first substrate 101 and the second substrate 102.

As illustrated in FIGS. 11 and 14, the gate line GL is positioned on the first substrate 101. In an embodiment, for example, the gate line GL is located between a first sub-pixel area and a second sub-pixel area of the first substrate 101. Such sub-pixel areas correspond to the first sub-pixel electrode PE1 and the second sub-pixel electrode PE2. The display device, the display panel 100, the first substrate 101 and/or the second substrate 102 may be considered as including the pixel PX and the sub-pixel area described above.

The first gate electrode GE1 may have a shape protruding from a main portion of the gate line GL, as illustrated in FIG. 11. The first gate electrode GE1 may be a portion of the gate line GL. That is, one of the first gate electrode GE1 and the gate line GL may extend to define the other one of the first gate electrode GE1 and the gate line GL. Such extending portions may also be used to define portions of other structures described herein.

The first gate electrode GE1 may include a substantially same material and may have a substantially same structure (a multilayer structure) as those of the gate line GL. The first gate electrode GE1 and the gate line GL may be substantially simultaneously formed in a substantially same process. As being formed in a same process, the first gate electrode GE1 and the gate line GL may be disposed in a same layer among those layers disposed on and/or within the first substrate 101. Such same-layer configuration may also be used to describe other elements described herein as being simultaneously formed in a substantially same process.

As illustrated in FIG. 11, the second gate electrode GE2 may have a shape protruding from the gate line GL. The second gate electrode GE2 may be a portion of the gate line GL.

The second gate electrode GE2 may include a substantially same material and may have a substantially same structure (a multilayer structure) as those of the gate line GL. The second gate electrode GE2 and the gate line GL may be substantially simultaneously formed in a substantially same process.

As illustrated in FIG. 11, the third gate electrode GE3 may have a shape protruding from the gate line GL. The third gate electrode GE3 may be a portion of the gate line GL.

The third gate electrode GE3 may include a substantially same material and may have a substantially same structure (a multilayer structure) as those of the gate line GL. The third gate electrode GE3 and the gate line GL may be substantially simultaneously formed in a substantially same process.

As illustrated in FIG. 11, the first sustain electrode 7751 encloses the first sub-pixel electrode PE1 in a top plan view. In such an embodiment, the first sustain electrode 7751 overlaps an edge of the first sub-pixel electrode PE1.

The first sustain electrode 7751 may include a substantially same material and may have a substantially same structure (a multilayer structure) as those of the aforementioned gate line GL. The first sustain electrode 7751 and the gate line GL may be substantially simultaneously formed in a substantially same process.

The first sustain electrode 7751 receives a first sustain voltage from an external driving circuit (not shown). The first sustain voltage may be substantially equal to a common voltage.

As illustrated in FIG. 11, the second sustain electrode 7752 encloses the second sub-pixel electrode PE2. In such an embodiment, the second sustain electrode 7752 overlaps an edge of the second sub-pixel electrode PE2.

The second sustain electrode 7752 may include a substantially same material and may have a substantially same structure (a multilayer structure) as those of the aforementioned gate line GL. The second sustain electrode 7752 and the gate line GL may be substantially simultaneously formed in a substantially same process.

The second sustain electrode 7752 receives a second sustain voltage from an external driving circuit (not shown). The second sustain voltage may be substantially equal to the common voltage. In an embodiment, second sustain electrodes 7752 of pixels PX adjacent to one another along the gate line GL may be connected to one another. In addition, second sustain electrodes 7752 and first sustain electrodes 7751 of pixels adjacent to one another along the data line DL1 may be connected to one another.

As illustrated in FIGS. 14 and 15, the gate insulating layer 3311 is positioned on the gate line GL, the first gate electrode GE1, the second gate electrode GE2, the first sustain electrode 7751 and the second sustain electrode 7752. The gate insulating layer 3311 may be positioned over an entire surface of the first substrate 101 including the gate line GL, the first gate electrode GE1, the second gate electrode GE2, the first sustain electrode 7751, the second sustain electrode 7752 and the sustain line 7750.

The gate insulating layer 3311 has an opening corresponding to a third contact hole CH3 and a fourth contact hole CH4. A portion of the third drain electrode DE3 and the first sustain electrode 7751 are exposed through the third contact hole CH3, and another portion of the third drain electrode DE3 and the second sustain electrode 7752 are exposed through the fourth contact hole CH4.

As illustrated in FIG. 14, the data line DL1 is positioned on the gate insulating layer 3311. The data line DL1 intersects the gate line GL in the top plan view. The data line DL1 has a length extended along the X-axis direction and a width defined along the Y-axis direction. Although not illustrated, the width of the data line DL1 at an intersection of the data line DL1 and the gate line GL may be less than the width of another portion or remaining portions of the data line DL1. The data line DL1 may include a substantially same material as a material included in the aforementioned data line DL1.

As illustrated in FIG. 14, the first semiconductor layer 3321 is positioned on the gate insulating layer 3311. As illustrated in FIGS. 11 and 13, the first semiconductor layer 3321 overlaps at least a portion of the first gate electrode GE1. The first semiconductor layer 3321 may include amorphous silicon, polycrystalline silicon, or the like.

As illustrated in FIG. 13, first and second ohmic contact layers 3321a and 3321b are positioned on the first semiconductor layer 3321. The first ohmic contact layer 3321a and the second ohmic contact layer 3321b face each other, having a channel area of the first switching element TFT1 therebetween.

As illustrated in FIG. 15, the second semiconductor layer 3322 is positioned on the gate insulating layer 3311. As illustrated in FIGS. 11 and 15, the second semiconductor layer 3322 overlaps at least a portion of the second gate electrode GE2. The second semiconductor layer 3322 may include amorphous silicon, polycrystalline silicon, or the like.

As illustrated in FIG. 15, third and fourth ohmic contact layers 3322a and 3322b are positioned on the second semiconductor layer 3322. The third ohmic contact layer 3322a and the fourth ohmic contact layer 3322b face each other, having a channel area of the second switching element TFT2 therebetween.

The first ohmic contact layer 3321a and the third ohmic contact layer 3322a are connected to each other. In an embodiment, for example, the first ohmic contact layer 3321a and the third ohmic contact layer 3322a may be integrally formed into a unitary structure. That is, one of the first ohmic contact layer 3321a and the third ohmic contact layer 3322a may extend to define the other one of the first ohmic contact layer 3321a and the third ohmic contact layer 3322a.

As illustrated in FIG. 15, the third semiconductor layer 3323 is positioned on the gate insulating layer 3311. As illustrated in FIGS. 11 and 15, the third semiconductor layer 3323 overlaps at least a portion of the third gate electrode GE3.

As illustrated in FIG. 15, fifth, sixth and seventh ohmic contact layers 3323a, 3323b and 3323c are positioned on the third semiconductor layer 3323. The fifth ohmic contact layer 3323a and the sixth ohmic contact layer 3323b face each other with a first channel area of the third switching element TFT3 therebetween, and the sixth ohmic contact layer 3323b and the seventh ohmic contact layer 3323c face each other with a second channel area of the third switching element TFT3 therebetween.

As illustrated in FIG. 14, the first source electrode SE1 is also positioned on the first ohmic contact layer 3321a and the gate insulating layer 3311. As illustrated in FIG. 14, the first source electrode SE1 may have a shape protruding from the data line DL1. Although not illustrated, the first source electrode SE1 may be a portion of the data line DL1. At least a portion of the first source electrode SE1 overlaps the first semiconductor layer 3321 and the first gate electrode GE1.

The first source electrode SE1 may have one of an I-like shape, a C-like shape and a U-like shape, in the top plan view. The first source electrode SE1 having a U-like shape is illustrated in FIG. 11, and a convex portion of the first source electrode SE1 faces toward the second sub-pixel electrode PE2.

The first source electrode SE1 may include a substantially same material and may have a substantially same structure (a multilayer structure) as those of the aforementioned data line DL1. The first source electrode SE1 and the data line DL1 may be substantially simultaneously formed in a substantially same process.

As illustrated in FIG. 14, the first drain electrode DE1 is positioned on the second ohmic contact layer 3321b and the gate insulating layer 3311. At least a portion of the first drain electrode DE1 overlaps the first semiconductor layer 3321 and the first gate electrode GE1. The first drain electrode DE1 is connected to the first sub-pixel electrode PE1.

The first drain electrode DE1 may include a substantially same material and may have a substantially same structure (a multilayer structure) as those of the data line DL1. The first drain electrode DE1 and the data line DL1 may be substantially simultaneously formed in a substantially same process.

The channel area of the first switching element TFT1 is located at a portion of the first semiconductor layer 3321 between the first source electrode SE1 and the first drain electrode DE1. A portion of the first semiconductor layer 3321 corresponding to or defining the channel area has a smaller cross-sectional thickness than a cross-sectional thickness of another portion or remaining portions of the first semiconductor layer 3321.

As illustrated in FIG. 15, the second source electrode SE2 is positioned on the third ohmic contact layer 3322a. Although not illustrated, the third ohmic contact layer 3322a is also positioned on the gate insulating layer 3311. The second source electrode SE2 is integrally formed into a unitary structure with the first source electrode SE1. At least a portion of the second source electrode SE2 overlaps the second semiconductor layer 3322 and the second gate electrode GE2.

The second source electrode SE2 may have one of an I-like shape, a C-like shape and a U-like shape in the top plan view. The second source electrode SE2 having a U-like shape is illustrated in FIG. 11, and a convex portion of the second source electrode SE2 faces toward the first sub-pixel electrode PE1.

The second source electrode SE2 may include a substantially same material and may have a substantially same structure (a multilayer structure) as those of the aforementioned data line DL1. The second source electrode SE2 and the data line DL1 may be substantially simultaneously formed in a substantially same process.

As illustrated in FIG. 15, the second drain electrode DE2 is positioned on the fourth ohmic contact layer 3322b and the gate insulating layer 3311. At least a portion of the second drain electrode DE2 overlaps the second semiconductor layer 3322 and the second gate electrode GE2. The second drain electrode DE2 is connected to the second sub-pixel electrode PE2.

The second drain electrode DE2 may include a substantially same material and may have a substantially same structure (a multilayer structure) as those of the data line DL1. The second drain electrode DE2 and the data line DL1 may be substantially simultaneously formed in a substantially same process.

The channel area of the second switching element TFT2 is located at a portion of the second semiconductor layer 3322 between the second source electrode SE2 and the second drain electrode DE2. A portion of the second semiconductor layer 3322 corresponding to or defining the channel area has a smaller cross-sectional thickness than a cross-sectional thickness of another portion or remaining portions of the second semiconductor layer 3322.

As illustrated in FIG. 15, the third source electrode SE3 is positioned on the fifth ohmic contact layer 3323a and the gate insulating layer 3311. The third source electrode SE3 and the second drain electrode DE2 are integrally formed into a unitary structure. At least a portion of the third source electrode SE3 overlaps the third semiconductor layer 3323 and the third gate electrode GE3.

The third source electrode SE3 may have one of an I-like shape, a C-like shape and a U-like shape in the top plan view. The third source electrode SE3 having a I-like shape is illustrated in FIG. 11.

The third source electrode SE3 may include a substantially same material and may have a substantially same structure (a multilayer structure) as those of the data line DL1. The third source electrode SE3 and the data line DL1 may be substantially simultaneously formed in a substantially same process.

As illustrated in FIG. 15, the floating electrode FE is positioned on the sixth ohmic contact layer 3323b. The floating electrode FE does not contact any conductor or conductive element of the pixel PX other than the sixth ohmic contact layer 3323b. That is, the floating electrode FE is electrically floating as being disconnected from other conductive elements of the pixel PX. At least a portion of the floating electrode FE overlaps the third semiconductor layer 3323 and the third gate electrode GE3.

The floating electrode FE may have one of an I-like shape, a C-like shape and a U-like shape in the top plan view. The source electrode SE having an I-like shape is illustrated in FIG. 11.

The floating electrode FE may include a substantially same material and may have a substantially same structure (a multilayer structure) as those of the aforementioned data line DL1. The floating electrode FE and the data line DL1 may be substantially simultaneously formed in a substantially same process. In embodiments, the floating electrode FE may be omitted.

As illustrated in FIG. 15, the third drain electrode DE3 is positioned on the seventh ohmic contact layer 3323c. Although not illustrated, the third drain electrode DE3 is also positioned on the gate insulating layer 3311. At least a portion of the third drain electrode DE3 overlaps the third semiconductor layer 3323 and the third gate electrode GE3. The third drain electrode DE3 is connected to the first sustain electrode 7751 and the second sustain electrode 7752.

The third drain electrode DE3 may include a substantially same material and may have a substantially same structure (a multilayer structure) as those of the aforementioned data line DL1. The third drain electrode DE3 and the data line DL1 may be substantially simultaneously formed in a substantially same process.

The first channel area of the third switching element TFT3 is located at a portion of the third semiconductor layer 3323 between the third source electrode SE3 and the floating electrode FE, and the second channel area of the third switching element TFT3 is located at a portion of the third semiconductor layer 3323 between the floating electrode FE and the third drain electrode DE3. The portion of the third semiconductor layer 3323 corresponding to or defining the first and second channel areas has a cross-sectional thickness smaller than a cross-sectional thickness of another portion or remaining portions of the third semiconductor layer 3323.

Although not illustrated, the first semiconductor layer 3321 may be further disposed between the gate insulating layer 3311 and the first source electrode SE1. In addition, the first semiconductor layer 3321 may be further disposed between the gate insulating layer 3311 and the first drain electrode DE1. Herein, a semiconductor layer located between the gate insulating layer 3311 and the first source electrode SE1 will be defined as a first additional semiconductor layer, and a semiconductor layer located between the gate insulating layer 3311 and the first drain electrode DE1 will be defined as a second additional semiconductor layer. In such an embodiment, the aforementioned first ohmic contact layer 3321a may be further disposed between the first additional semiconductor layer and the first source electrode SE1, and the aforementioned second ohmic contact layer 3321b may be further disposed between the second additional semiconductor layer and the first drain electrode DE1.

In addition, although not illustrated, the second semiconductor layer 3322 may be further disposed between the gate insulating layer 3311 and the second source electrode SE2. In addition, the second semiconductor layer 3322 may be further disposed between the gate insulating layer 3311 and the second drain electrode DE2. Herein, a semiconductor layer between the gate insulating layer 3311 and the second source electrode SE2 will be defined as a third additional semiconductor layer, and a semiconductor layer between the gate insulating layer 3311 and the second drain electrode DE2 will be defined as a fourth additional semiconductor layer. In such an embodiment, the aforementioned third ohmic contact layer 3322a may be further disposed between the third additional semiconductor layer and the second source electrode SE2, and the aforementioned fourth ohmic contact layer 3322b may be further disposed between the fourth additional semiconductor layer and the second drain electrode DE2.

In addition, although not illustrated, the third semiconductor layer 3323 may be further disposed between the gate insulating layer 3311 and the third source electrode SE3. In addition, the third semiconductor layer 3323 may be further disposed between the gate insulating layer 3311 and the third drain electrode DE3. Herein, the semiconductor layer between the gate insulating layer 3311 and the third source electrode SE3 will be defined as a fifth additional semiconductor layer, and the semiconductor layer between the gate insulating layer 3311 and the third drain electrode DE3 will be defined as a sixth additional semiconductor layer. In such an embodiment, the aforementioned fifth ohmic contact layer 3323*a* may be further disposed between the fifth additional semiconductor layer and the third source electrode SE3, and the aforementioned seventh ohmic contact layer 3323*c* may be further disposed between the sixth additional semiconductor layer and the third drain electrode DE3.

In addition, although not illustrated, the first semiconductor layer 3321 may be further disposed between the gate insulating layer 3311 and a portion of the data line DL1. In an embodiment, for example, the first semiconductor layer 3321 may be further disposed between the gate insulating layer 3311 and the data line DL1. Herein, the semiconductor layer between the gate insulating layer 3311 and the different portion of the data line DL1 will be defined as a seventh additional semiconductor layer. In such an embodiment, the aforementioned first ohmic contact layer 3321*a* may be further disposed between the seventh additional semiconductor layer and the different portion of the data line DL1.

As illustrated in FIG. 14, the protective layer 3320 is positioned on the data line DL1, the first source electrode SE1, the second source electrode SE2, the third source electrode SE3, the floating electrode FE, the first drain electrode DE1, the second drain electrode DE2 and the third drain electrode DE3. The protective layer 3320 may be positioned over an entire surface of the first substrate 101 including the data line DL1, the first source electrode SE1, the second source electrode SE2, the third source electrode SE3, the floating electrode FE, the first drain electrode DE1, the second drain electrode DE2 and the third drain electrode DE3.

The protective layer 3320 has openings defined corresponding to a first contact hole CH1, a second contact hole CH2, the third contact hole CH3 and the fourth contact hole CH4. The first drain electrode DE1 is exposed through the first contact hole CH1, and the second drain electrode DE2 is exposed through the second contact hole CH2.

As illustrated in FIGS. 11 and 14, the first color filter layer 3351 is positioned on the protective layer 3320 so as to overlap the first sub-pixel electrode PE1, the first sustain electrode 7751, and the data line DL1. The first color filter layer 3351 may have a predetermined color. To this end, the first color filter layer 3351 may include a pigment corresponding to the predetermined color.

As illustrated in FIGS. 11 and 15, the second color filter layer 3352 is positioned on the protective layer 3320 so as to overlap the second sub-pixel electrode PE2, the second sustain electrode 7752 and the data line DL1. The second color filter layer 3352 may have a predetermined color. To this end, the second color filter layer 3352 may include a pigment corresponding to the predetermined color. The second color filter layer 3352 has a substantially same color as a color of the first color filter layer 3351.

As illustrated in FIG. 11, the dummy color filter layer 8801 may be located between the first color filter layer 3351 and the second color filter layer 3352. The dummy color filter layer 8801 will be described below in more detail.

The first color filter layer 3351, the second color filter layer 3352, and the dummy color filter layer 8801 are not located at the first contact hole CH1, the second contact hole CH2, the third contact hole CH3 and the fourth contact hole CH4.

The insulating interlayer 3325 is positioned on the first color filter layer 3351, the second color filter layer 3352, the dummy color filter layer 8801, and the protective layer 3320. The insulating interlayer 3325 may be positioned over an entire surface of the first substrate 101 including the first color filter layer 3351, the second color filter layer 3352, the dummy color filter layer 8801 and the protective layer 3320. The insulating interlayer 3325 has openings defined corresponding to the first contact hole CH1, the second contact hole CH2, the third contact hole CH3 and the fourth contact hole CH4, respectively.

The first sub-pixel electrode PE1 is positioned on the insulating interlayer 3325 so as to overlap the first color filter layer 3351. The first sub-pixel electrode PE1 is connected to the first drain electrode DE1 through the first contact hole CH1.

The first sub-pixel electrode PE1 may include a transparent conductive material such as indium tin oxide ("ITO") or indium zinc oxide ("IZO"). In such an embodiment, ITO may be a polycrystalline or monocrystalline material, and IZO may be a polycrystalline or monocrystalline material as well. Alternatively, IZO may be an amorphous material.

The second sub-pixel electrode PE2 is positioned on the insulating interlayer 3325 so as to overlap the second color filter layer 3352. The second sub-pixel electrode PE2 is connected to the second drain electrode DE2 through the second contact hole CH2. The second sub-pixel electrode PE2 may include a substantially same material as a material included in the aforementioned first pixel electrode PE1.

A first connection electrode 1881 is positioned on the insulating interlayer 3325, corresponding to the third contact hole CH3. The first connection electrode 1881 connects a portion of the third drain electrode DE3 and the first sustain electrode 7751 to each other at the third contact hole CH3. The first connection electrode 1881 may include a substantially same material as a material included in the aforementioned first sub-pixel electrode PE1.

A second connection electrode 1882 is positioned on the insulating interlayer 3325, corresponding to the fourth contact hole CH4. The second connection electrode 1882 connects another portion of the third drain electrode DE3 and the second sustain electrode 7752 to each other at the fourth contact hole CH4. The second connection electrode 1882 may include a substantially same material as a material included in the second sub-pixel electrode PE2. As including a same material, the first connection electrode 1881, the second connection electrode 1882, and the first and second sub-pixel electrodes PE1 and PE2 may be disposed in a same layer among those layers disposed on and/or within the first substrate 101, such as being formed from a same material layer. Such same-layer configuration may also be used to describe other elements described herein as including a same material.

As illustrated in FIGS. 14 to 16, the light blocking layer 3376 is disposed on the insulating interlayer 3325.

As illustrated in FIGS. 12 and 13, the light blocking layer 3376 overlaps the gate line GL, the data line DL1, the first switching element TFT1, the second switching element TFT2, the third switching element TFT3, the first connection electrode 1881, the second connection electrode 1882, the first contact hole CH1, the second contact hole CH2, the third contact hole CH3, and the fourth contact hole CH4. In such an embodiment, the light blocking layer 3376 may further overlap a portion of the first sub-pixel electrode PE1 and a portion of the second sub-pixel electrode PE2.

From the planar perspective view (e.g., top plan view) illustrated in FIG. 12, a partial area of the pixel PX surrounded by the light blocking layer 3376 is defined as a light emission area A of the pixel PX. In other words, the light blocking layer 3376 is disposed in a remaining area except for the light emission area A of the pixel PX. A light from the light source 821 (refer to FIGS. 1 and 2) is emitted to outside the display panel 100 through the light emission area A1 of the pixel PX. Since the optical film 700 is disposed in a light emission direction of the display panel 100 (e.g., the Z-axis direction), the emitted light passes through the optical film 700.

The light emission area A of the pixel PX may include a first sub-light emission area SA1 and a second sub-light emission area SA2. The first sub-light emission area SA1 is disposed corresponding to the first pixel electrode PE1, and the second output light area SA2 is disposed corresponding to the second pixel electrode PE2. In the top plan view, a size of the second light emission area SA2 may be larger than a size of the first light emission area SA1.

The light blocking layer 3376 may include a photosensitive organic material. In such an embodiment, the photosensitive organic material may be a photosensitive organic material of a positive type or a negative type.

As illustrated in FIGS. 13 and 16, taken together with the various embodiments of the optical films illustrated in FIGS. 3-10, the first protruding portions 711 of the first pattern layer 701 and the second protruding portions 722 of the second pattern layer 702 overlap the light emission area A of the pixel PX. In such an embodiment, the first pattern layer 701 among the first and second pattern layers 701 and 702 is disposed closer to the display panel 100 (or the second substrate 102 of the display panel 100), and the number of first protruding portions 711 among the first protruding portions 711 of the first pattern layer 701 that overlap the light emission area A of one pixel PX may be in a range from about 3 to about 15. In other words, in the cross-sectional view illustrated in FIG. 16, the number of first protruding portions 711 that overlap the light emission area A in the Z-axis direction may be in a range from about 3 to about 15. As one example, as shown in FIGS. 13 and 16, the number of first protruding portions 711 that overlap the light emission area A may be five.

In addition, when the first sub-pixel electrode PE1 and the second sub-pixel electrode PE2 of the aforementioned pixel PX are respectively defined as pixel electrodes of the pixel PX, the number of first protruding portions 711 among the plurality of first protruding portions 711 that overlap a pixel electrode may be in a range from about 3 to about 15. In such an embodiment, when a portion of the pixel electrode that does not overlap the light blocking layer 3376 is defined as a non-overlap portion of the pixel electrode, the number of first protruding portions 711 among the plurality of first protruding portions 711 that overlap the non-overlap portion of the pixel electrode may be in a range from about 3 to about 15.

As illustrated in FIGS. 11 and 14, the column spacer 9901 is positioned on the light blocking layer 3376 so as to overlap the dummy color filter layer 8801. As illustrated in FIG. 12, the column spacer 9901 and the light blocking layer 3376 may be integrally formed into a unitary structure. When the column spacer 9901 and the light blocking layer 3376 are unitarily formed as described above, a portion of the unitary structure overlapping the dummy color filter layer 8801 corresponds to the aforementioned column spacer 9901.

The column spacer 9901 may include a substantially same material and may have a substantially same structure as those of the light blocking layer 3376. The column spacer 9901 and the light blocking layer 3376 may be substantially simultaneously formed in a substantially same process.

A height of the column spacer 9901 depends on a height of the dummy color filter layer 8801 located below the column spacer 9901, and the height of the dummy color filter layer 8801 depends on a planar area of the dummy color filter layer. Accordingly, the height of the column spacer 9901 depends on the planar area of the dummy color filter layer 8801. As the planar area of the dummy color filter layer 8801 increases, the height of the dummy color filter layer 8801 increases, and accordingly, the height of the column spacer 9901 positioned on the dummy color filter layer 8801 also increases.

As illustrated in FIG. 14, the height h1 of the column spacer 901 is a distance from a reference surface of the first substrate (e.g., the flat inner surface of the first substrate 101) to an uppermost surface of the column spacer 9901, and is a distance measured in the Z-axis direction. The reference surface of the first substrate 101 intersects the X-axis direction perpendicularly, such that the reference surface may be disposed in a plane defined by the X-axis direction and Y-axis direction. The uppermost surface of the column spacer 9901 refers to one of surfaces of the column spacer 9901 that is farthest in the Z-axis direction from the aforementioned reference surface. In an embodiment, the height of the column spacer 9901 may be defined as a distance between a reference surface of the second substrate 102 (e.g., the flat inner surface of the second substrate 102) and the column spacer 9901. Herein, the distance between the reference surface of the second substrate 102 and the column spacer 9901 is a distance in the Z-axis direction.

The height h11 of the dummy color filter layer 8801 may also be defined as a distance from the reference surface of the first substrate 101 to an uppermost surface Si of the dummy color filter layer 8801, and in such an embodiment, the distance is a distance measured in the Z-axis direction.

The planar area of the dummy color filter layer 8801 means a size of a surface (hereinafter, "an opposing surface") of surfaces of the dummy color filter layer 8801 that is closest to the reference surface of the second substrate 102. In an embodiment, for example, as illustrated in FIG. 14, the opposing surface of the dummy color filter layer 8801 faces the reference surface of the second substrate 102, and is parallel to the reference surface.

Figure 17:
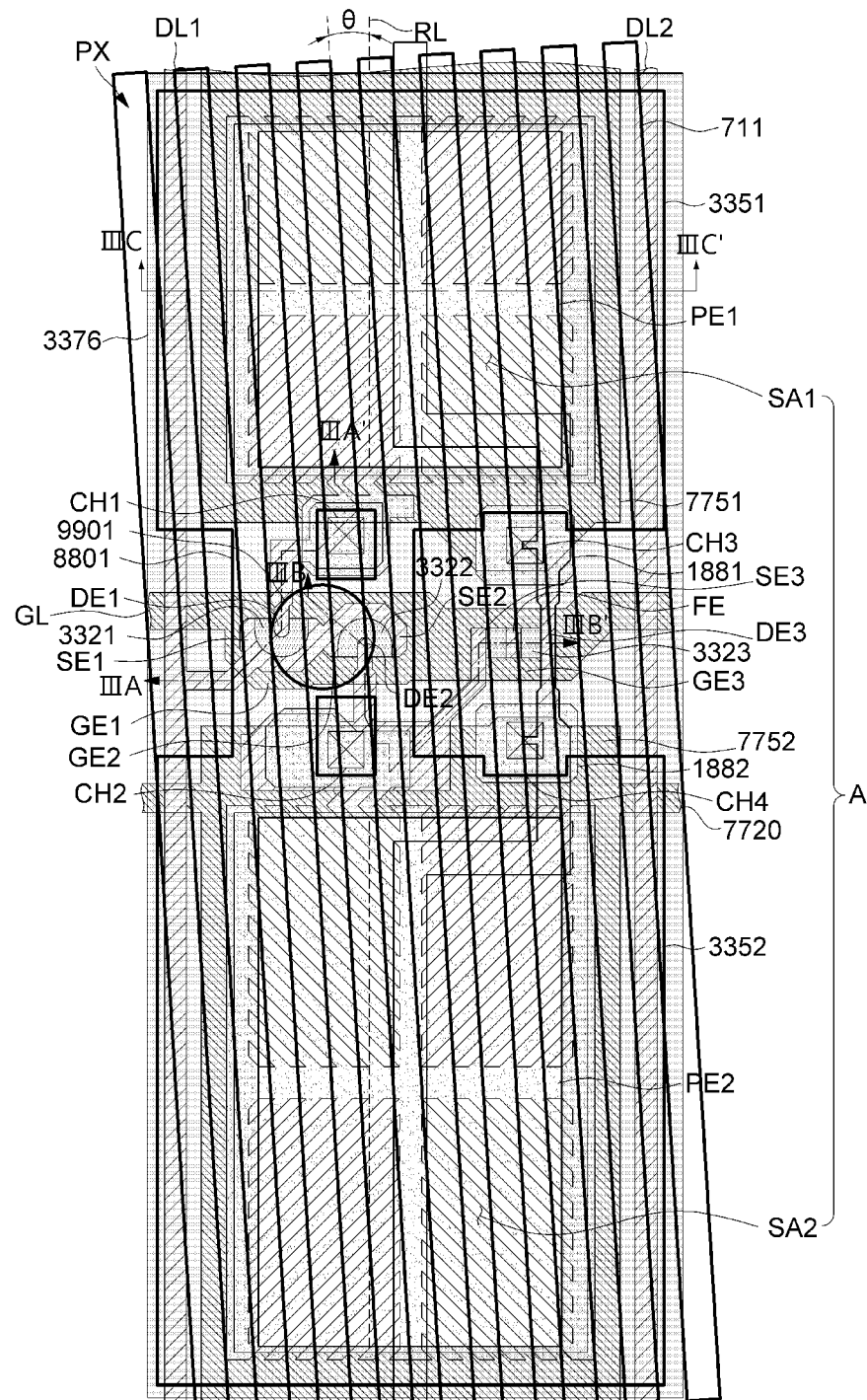
FIG. 17 is a top plan view illustrating another embodiment of one pixel included in the display panel illustrated in FIG. 1.

FIG. 17 is a top plan view illustrating another embodiment of one pixel included in the display panel illustrated in FIG. 1. The pixel of FIG. 17 may have the structure of FIGS. 14-16 described above.

First protruding portions 711 of a first pattern layer 701 may be disposed to be inclined at a predetermined angle θ with respect to a reference line RL, as illustrated in FIG. 17. The angle θ indicates how much the first protruding portion 711 is rotated from the reference line RL in a clockwise (+) or counterclockwise (−) direction. Where the second protruding portion 722 is lengthwise extended parallel to the first protruding portion 711, the angle θ may also indicate how much the second protruding portion 711 is rotated from the reference line RL in a clockwise (+) or counterclockwise (−) direction, without being limited thereto.

The reference line RL may be a line parallel to one side of a display panel 100, for example. As a specific example, the reference line RL may be any one among four sides of the display panel 100 in the top plan view, which is parallel to the X-axis direction.

As another example, the aforementioned reference line RL may be a line parallel to a longitudinal direction (e.g., the X-axis direction) of a data line DL1.

As another example, the aforementioned reference line RL may be a line parallel to an arrangement direction (e.g., the X-axis direction) of two sub-pixel electrodes PE1 and PE2 that are included in one pixel PX. Specifically, the reference line RL may be a line parallel to a line that passes through respective center points of the two sub-pixel electrodes PE1 and PE2.

As another example, the aforementioned reference line RL may be a line parallel to an arrangement direction of pixels PX that are connected in common to one same data line DL1.

The aforementioned angle θ may be, for example, in a range from about 5 degrees to about 10 degrees, based on a direction of rotation from the reference line RL in a clockwise (+) or counterclockwise (−) direction. In other words, the aforementioned angle θ may be an angle θ between the reference line RL and the first protruding portion 711 that is measured in the counterclockwise direction from the reference line RL, and the angle θ may be in a range from about −5 degrees to about −10 degrees.

In addition an angle between a length extension direction of the third drain electrode DE3 and the first protruding portion 711 may be substantially the same as the aforementioned angle θ. In an embodiment, for example, an angle between a length extension direction of the first protruding portion 711 and a portion of the third drain electrode DE3 that is lengthwise parallel to the reference line RL may be in a range from about 5 degrees to about 10 degrees. Specifically, the angle, between the first protruding portion 711 and the portion of the third drain electrode DE3 that is parallel to the reference line RL, which is measured in the counterclockwise direction from the portion of the third drain electrode DE3 may be in a range from about −5 degrees to about −10 degrees.

Figure 18:
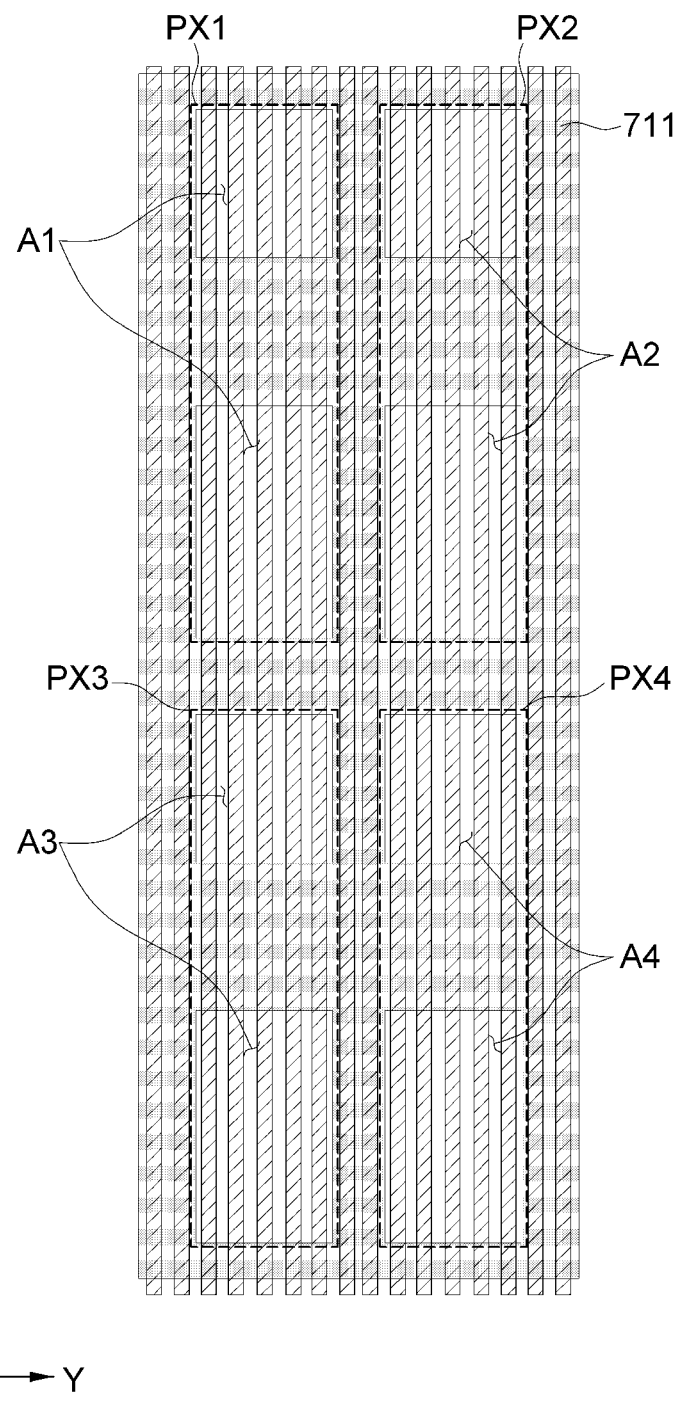
FIG. 18 is a top plan view illustrating an embodiment of a display device including a plurality of pixels having one or more of the structures illustrated in FIGS. 11 to 16.

FIG. 18 is a top plan view illustrating an embodiment of a display device including a plurality of pixels having one or more of the structures illustrated in FIGS. 11 to 16.

FIG. 18 shows four adjacent pixels PX1, PX2, PX3 and PX4 among pixels included in the display panel 100 of FIG. 1. Although not illustrated in FIG. 18, each of the pixels PX, PX2, PX3, and PX4 in FIG. 18 has one or more of the structures of FIGS. 11 to 16 described above. That is, for convenience of explanation, repeated description of the elements included in each of the pixels PX1, PX2, PX3, and PX4 in FIG. 18 are omitted.

The first pixel PX1 and the second pixel PX2 arranged along the Y-axis direction are connected to a same one gate line, and are connected to different data lines, respectively. In an embodiment, for example, first, second, and third switching elements TFT1, TFT2, and TFT3 of the first pixel PX1 and first, second, and third switching elements TFT1, TFT2, and TFT3 of the second pixel PX2 are connected in common to a same first gate line GL1. The first switching element TFT1 of the first pixel PX is connected to the first data line DL1, and the first switching element TFT1 of the second pixel PX2 is connected to the second data line DL2.

The third pixel PX3 and the fourth pixel PX4 arranged along the Y-axis direction are connected to a same one gate line, and are connected to different data lines, respectively. In an embodiment, for example, first, second, and third switching elements TFT1, TFT2, and TFT3 of the third pixel PX3 and first, second, and third switching elements TFT1, TFT2, and TFT3 of the fourth pixel PX4 are connected in common to a same second gate line GL2. The first switching element TFT1 of the third pixel PX3 is connected to the first data line DL1, and the first switching element TFT1 of the fourth pixel PX4 is connected to the second data line DL2.

The first pixel PX1 and the third pixel PX3 arranged along the X-axis direction are connected to a same one data line, and are connected to different gate lines, respectively. In an embodiment, for example, the first switching element TFT1 of the first pixel PX1 and the first switching element TFT1 of the third pixel PX3 are connected in common to the one first data line DL1. In addition, the first, second, and third switching elements TFT1, TFT2, and TFT3 of the first pixel PX1 are connected to the first gate line GL1, and the first, second, and third switching elements TFT1, TFT2, and TFT3 of the third pixel PX3 are connected the second gate line GL2.

The second pixel PX2 and the fourth pixel PX4 arranged along the X-axis direction are connected to a same one data line, and are connected to different gate lines, respectively. In an embodiment, for example, the first switching element TFT1 of the second pixel PX2 and the first switching element TFT1 of the fourth pixel PX4 are connected in common to the one second data line DL2. In addition, the first, second, and third switching elements TFT1, TFT2, and TFT3 of the second pixel PX2 are connected to the first gate line GL1, and the first, second, and third switching elements TFT1, TFT2, and TFT3 of the fourth pixel PX4 are connected the second gate line GL2.

The light blocking layer 3376 defines a light emission area of each of the pixels PX1, PX2, PX3, and PX4. In an embodiment, for example, the light blocking layer 3376 may include a light emission area (hereinafter, "a first light emission area A1") of the first pixel PX1, a light emission area (hereinafter, "a second light emission area A2") of the second pixel PX2, a light emission area (hereinafter, "a third light emission area A3") of the third pixel PX3, and a light emission area (hereinafter, "a fourth light emission area A4") of the fourth pixel PX4. In such an embodiment, each of the first, second, third, and fourth light emission areas A1, A2, A3, and A4 includes a first sub-light emission area and a second sub-light emission area (refer to SA1 and SA2 in FIG. 13, for example).

The first protruding portions 711 of the first pattern layer 701 and the second protruding portions 722 of the second pattern layer 702 overlap the light emission areas A1, A2, A3, and A4 of the respective pixels PX1, PX2, PX3, and PX4. In such an embodiment, the first pattern layer 701 among the first and second pattern layers 701 and 702 is disposed closer to the display panel 100 (or the second substrate 102 of the display panel 100), and the number of first protruding portions 711 among the first protruding portions 711 of the first pattern layer 701 that overlap one light emission area among the light emission areas A1, A2, A3, and A4 may be in a range from about 3 to about 15. In other words, as illustrated in FIG. 18, the number of first protruding portions 711 that overlap the first light emission area A1 may be in a range from 3 to 15.

The number of first protruding portions 711 that overlap the light emission areas A1, A2, A3, and A4 may be substantially the same as each other. In an embodiment, for example, as illustrated in FIG. 18, the number of first protruding portions 711 that overlap the first light emission area A1 may be five, the number of first protruding portions 711 that overlap the second light emission area A2 may be five, the number of first protruding portions 711 that overlap the third light emission area A3 may be five, and the number of first protruding portions 711 that overlap the fourth light emission area A4 may be five. In other words, as illustrated in FIG. 18, five first protruding portions 711 may overlap each light emission area among the light emission areas A1, A2, A3, and A4.

Figure 19:
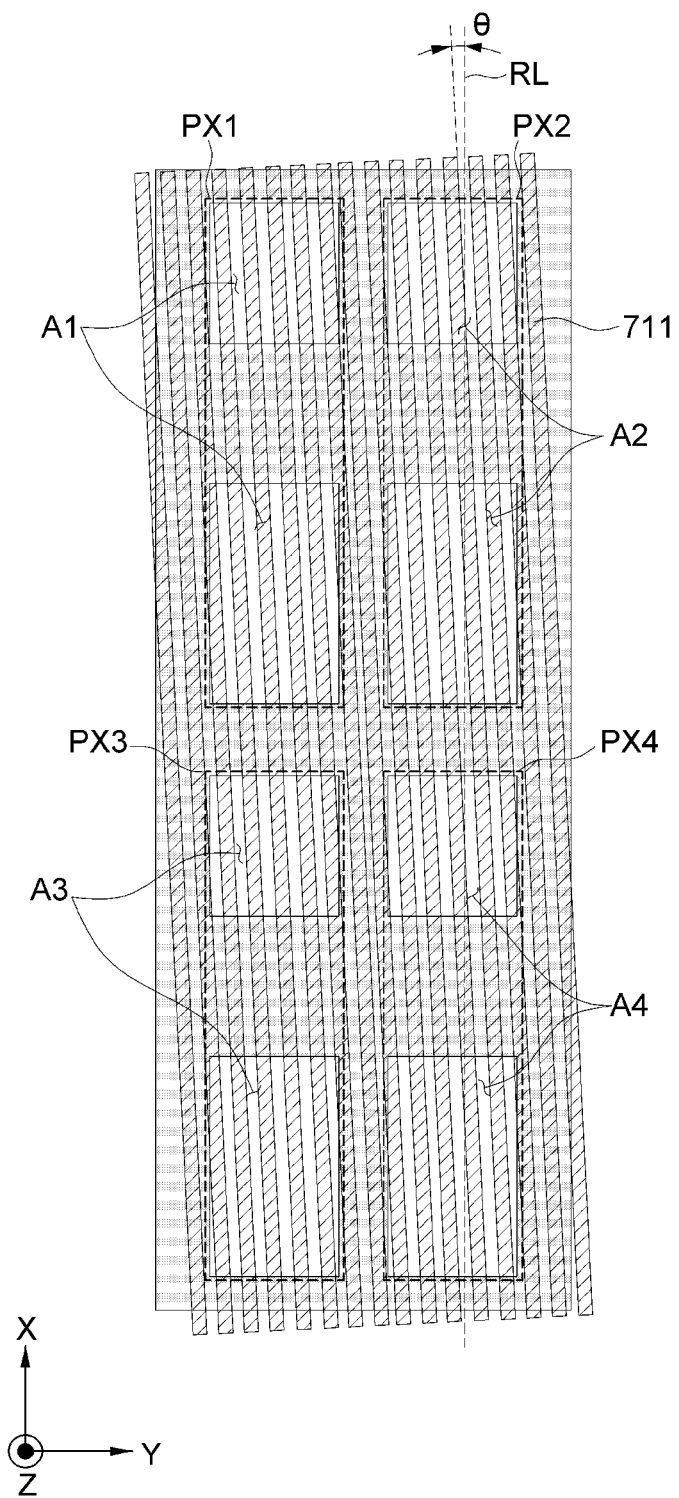
FIG. 19 is a top plan view illustrating another embodiment of a display device including a plurality of pixels having one or more of the structures illustrated in FIGS. 11 to 16.

FIG. 19 is a top plan view illustrating another embodiment of a display device including a plurality of pixels having one or more of the structures illustrated in FIGS. 11 to 16.

FIG. 19 shows four adjacent pixels PX1, PX2, PX3 and PX4 among the pixels included in the display panel 100 of FIG. 1. Although not illustrated in FIG. 19, each of the pixels PX1, PX2, PX3, and PX4 in FIG. 17 has the structure of FIGS. 11 to 16 described above. That is, for convenience of explanation, repeated descriptions of the elements included in each of the pixels PX1, PX2, PX3, and PX4 in FIG. 19 are omitted.

The first, second, third, and fourth pixels PX1, PX2, PX3, and PX4 of FIG. 19 are substantially the same as the first, second, third, and fourth pixels PX1, PX2, PX3, and PX4 of FIG. 18 described above, respectively. For convenience of explanation, repeated descriptions of the pixels PX1, PX2, PX3, and PX4 in FIG. 19 are omitted.

First protruding portions 711 of a first pattern layer 701 may be disposed to be inclined at a predetermined angle θ with respect to a reference line RL, as illustrated in FIG. 19. The angle θ indicates how much the first protruding portion 711 is rotated from the reference line RL in a clockwise (+) or counterclockwise (−) direction.

The reference line RL may be a line parallel to one side of a display panel 100, for example. As a specific example, the reference line RL may be any one of four sides of the display panel 100 in the top plan view, which is parallel to the X-axis direction.

As another example, the aforementioned reference line RL may be a line parallel to a longitudinal direction (e.g., the X-axis direction) of a data line.

As another example, the aforementioned reference line RL may be a line parallel to an arrangement direction (e.g., the X-axis direction) of two sub-pixel electrodes PE1 and PE2 that are included in one pixel PX. Specifically, the reference line RL may be a line parallel to a line that passes through respective center points of the two sub-pixel electrodes PE1 and PE2.

As another example, the aforementioned reference line RL may be a line parallel to an arrangement direction of pixels PX that are connected in common to one data line DL1.

The aforementioned angle θ may be, for example, in a range from about 5 degrees to about 10 degrees based on a direction of rotation from the reference line RL in a clockwise (+) or counterclockwise (−) direction. In other words, the aforementioned angle θ may be an angle θ between the reference line RL and the first protruding portion 711 that is measured in the counterclockwise direction from the reference line RL, and the angle θ may be in a range from about −5 degrees to about −10 degrees.

Figure 20:
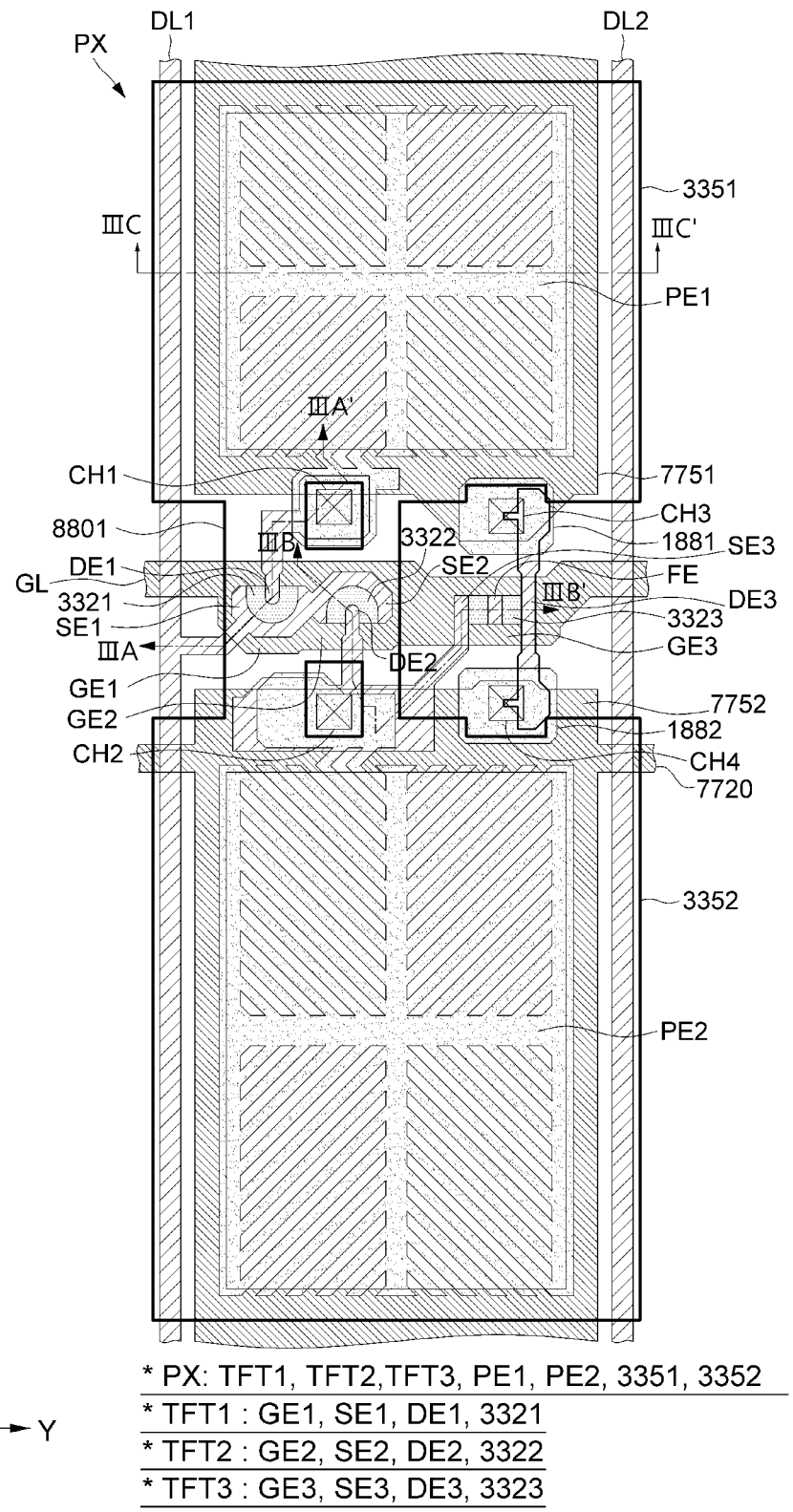
FIG. 20 is a top plan view illustrating still another embodiment of one pixel included in a display panel illustrated in FIG. 1.

FIG. 20 is a top plan view illustrating yet another embodiment of one pixel included in the display panel illustrated in FIG. 1.

As illustrated in FIG. 20, a third drain electrode DE3 may not overlap first and second sub-pixel electrodes PE1 and PE2. In addition, the third drain electrode DE3 of FIG. 20 is not connected to third drain electrodes of other pixels adjacent thereto in the X-axis direction.

The remaining configuration of the pixel illustrated in FIG. 20 is substantially the same as that of FIGS. 11 to 16 described above.

In an embodiment, the first protruding portions 711 disposed in the pixel of FIG. 20 may be disposed in a substantially same manner as the first protruding portions 711 of FIG. 13 or FIG. 17.

FIG. 21 is a view for explaining relative sizes of moiré according to the angle between the reference line and the first protruding portion 711.

FIG. 21 has eleven views respectively representing moiré in eleven corresponding display panels. A stripe pattern in a view indicates the presence of a moiré image. As illustrated in FIG. 21, the moiré is hardly visually recognized, when the angle θ between the reference line RL and the first protruding portion 711, in the counterclockwise direction from the reference line RL is in a range from about −5 to about −10 degrees. Particularly, the moiré is not visually recognized (labeled "X"), when the angle θ is in a range from about −7 to about −10 degrees. A stripe pattern is indicated where the moiré size is medium, such as when the angle θ between the reference line RL and the first protruding portion 711, in the counterclockwise direction from the reference line RL is in a range from about 0 to about −5 degrees.

As set forth hereinabove, according to one or more embodiments of the invention, an optical film of a display device includes a plurality of protruding portions, the number of protruding portions that overlap a light emission area of a pixel is in a range from 3 to 15, and an angle between the protruding portion and a reference line such as a line parallel to an extension direction of a data line is in a range from about 5 degrees to about 10 degrees based on a direction of rotation from the data line in a clockwise (+) or counterclockwise (−) direction. Accordingly, the moiré phenomenon of the display device may be substantially minimized or effectively prevented.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display device comprising:
a first substrate on which gate lines and data lines are disposed;
a second substrate facing the first substrate;
a pixel disposed between the first substrate and the second substrate, and connected to the gate line and the data line;
a light blocking layer disposed between the first substrate and the second substrate, and defining a light emission area of the pixel;
a polarizer on the second substrate; and
a first pattern layer disposed on the polarizer, and comprising a plurality of first protruding portions,
wherein the number of first protruding portions that overlap the light emission area among the plurality of first protruding portions is in a range from 3 to 15, and
an angle between the data line and each of the plurality of first protruding portions is in a range from about 5 degrees to about 10 degrees.

2. The display device of claim 1, wherein the angle is an angle between the data line and each of the first protruding portions measured in a counterclockwise direction from the data line.

3. The display device of claim 1, wherein the first protruding portions are disposed along a first direction, and each of the first protruding portions extends along a second direction that intersects the first direction.

4. The display device of claim 3, wherein an upper surface of at least one of the first protruding portions has a concavo-convex shape.

5. The display device of claim 3, wherein the first pattern layer further comprises a first projection and a second projection respectively protruding from facing edges of an upper surface included in at least one of the first protruding portions, and
the upper surface between the first projection and the second projection has a concavo-convex shape.

6. The display device of claim 4, wherein a concave portion and a convex portion of the upper surface are disposed along the second direction.

7. The display device of claim 3, wherein the first protruding portions are disposed at regular intervals along the first direction.

8. The display device of claim 1, wherein each of the first protruding portions has a cross-section of one of a trapezoidal shape, a parabolic shape, and a semicircular shape.

9. The display device of claim 1, wherein the light emission area includes a first sub-light emission area and a second sub-light emission area that are arranged along an extension direction of the data line,
wherein the pixel comprises:
a first sub-pixel electrode disposed on the first substrate, corresponding to the first sub-light emission area;
a second sub-pixel electrode disposed on the first substrate, corresponding to the second sub-light emission area;
a first sustain electrode overlapping the first sub-pixel electrode;
a second sustain electrode overlapping the second sub-pixel electrode;
a first switching element connected to the gate line, the data line, and the first sub-pixel electrode;
a second switching element connected to the gate line, the first switching element, and the second sub-pixel electrode; and
a third switching element connected to the gate line, the second switching element, the first sustain electrode, and the second sustain electrode,
wherein a drain electrode of the third switching element connected to the first and second sustain electrodes overlaps the first sub-pixel electrode and the second sub-pixel electrode,
wherein the drain electrode of the third switching element overlaps a center portion of the first sub-pixel electrode and a center portion of the second sub-pixel electrode, and
wherein the second sub-light emission area is larger than the first sub-light emission area.

10. The display device of claim 9, wherein an angle between each of the first protruding portions and the drain electrode of the third switching element is in a range from about 5 degrees to about 10 degrees.

11. The display device of claim 10, wherein an angle between each of the first protruding portions and the drain electrode is an angle between each of the first protruding portions and the drain electrode measured in a counterclockwise direction from the drain electrode.

12. The display device of claim 1, further comprising a second pattern layer on the first pattern layer, the second pattern layer having a refractive index different from a refractive index of the first pattern layer.

13. The display device of claim 12, wherein the second pattern layer comprises a plurality of second protruding portions that protrude toward the first pattern layer.

14. The display device of claim 13, wherein the first protruding portions and the second protruding portions are arranged in an alternating manner.

15. A display device comprising:
a first substrate on which gate lines and data lines are disposed;
a second substrate facing the first substrate;
a pixel disposed between the first substrate and the second substrate, the pixel comprising a switching element that is connected to the gate line and the data line, and a pixel electrode that is connected to the switching element;
a polarizer on the second substrate; and
a first pattern layer disposed on the polarizer and comprising a plurality of first protruding portions,
wherein the number of first protruding portions that overlap the pixel electrode among the plurality of first protruding portions is in a range from 3 to 15, and
an angle between the data line and each of the plurality of first protruding portions is in a range from about 5 degrees to about 10 degrees.

16. The display device of claim 15, wherein the angle is an angle between the data line and each of the first protruding portions measured in a counterclockwise direction from the data line.

17. The display device of claim 15, further comprising a light blocking layer that is disposed between the first substrate and the second substrate, and defines a light emission area of the pixel.

18. The display device of claim 17, wherein the number of first protruding portions that overlap a portion of the pixel electrode that does not overlap the light blocking layer is in a range from 3 to 15.

19. The display device of claim 17, wherein the light emission area includes a first sub-light emission area and a second sub-light emission area that are disposed along an extension direction of the data line.

20. The display device of claim 19, wherein the pixel further comprises:
a first sub-pixel electrode disposed on the first substrate, corresponding to the first sub-light emission area; and
a second sub-pixel electrode disposed on the first substrate, corresponding to the second sub-light emission area.

* * * * *